(12) United States Patent
Matsuura

(10) Patent No.: US 9,426,448 B2
(45) Date of Patent: Aug. 23, 2016

(54) CORRECTION APPARATUS

(71) Applicant: FUJIFILM Corporation, Tokyo (JP)

(72) Inventor: Yuuji Matsuura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/459,346

(22) Filed: Aug. 14, 2014

(65) Prior Publication Data

US 2014/0354780 A1 Dec. 4, 2014

Related U.S. Application Data

(63) Continuation of application No. PCT/JP2013/057153, filed on Mar. 14, 2013.

(30) Foreign Application Priority Data

Mar. 29, 2012 (JP) .................................. 2012-078108
Mar. 29, 2012 (JP) .................................. 2012-078109

(51) Int. Cl.
| | |
|---|---|
| *H04N 13/02* | (2006.01) |
| *H04N 15/00* | (2006.01) |
| *G03B 35/08* | (2006.01) |
| *H04N 5/232* | (2006.01) |
| *H04N 13/00* | (2006.01) |

(52) U.S. Cl.
CPC ............ *H04N 13/0246* (2013.01); *G03B 35/08* (2013.01); *H04N 5/23206* (2013.01); *H04N 5/23212* (2013.01); *H04N 13/0242* (2013.01); *H04N 13/0296* (2013.01); *H04N 13/0025* (2013.01)

(58) Field of Classification Search
USPC ......................................... 348/47, 48, 207.11
See application file for complete search history.

(56) References Cited

U.S. PATENT DOCUMENTS

| | | | |
|---|---|---|---|
| 2006/0146140 A1* | 7/2006 | Kennedy ..................... | 348/211.2 |
| 2006/0165405 A1 | 7/2006 | Kanai et al. | |
| 2011/0025861 A1* | 2/2011 | Dumm ..................... | 348/207.11 |

(Continued)

FOREIGN PATENT DOCUMENTS

| | | |
|---|---|---|
| JP | 08-307906 | 11/1996 |
| JP | 09-84056 | 3/1997 |
| JP | 11-27702 | 1/1999 |
| JP | 2006-139015 | 6/2006 |

OTHER PUBLICATIONS

International Search Report PCT/JP2013/057153 dated Apr. 9, 2013.

(Continued)

*Primary Examiner* — Christopher S Kelley
*Assistant Examiner* — Ana Picon-Feliciano
(74) *Attorney, Agent, or Firm* — Young & Thompson

(57) ABSTRACT

A correction apparatus is provided with terminals which are connected in one-to-one correspondence with each of lens apparatuses and which transmit control signals to the lens apparatuses which are connected. A common control signal is transmitted from all of the terminals to the lens apparatuses which are connected with the terminals. Individual control signals are transmitted to the lens apparatuses, which are connected with the terminals, from all of the terminals or from the other terminals than any one terminal. The group of terminals are communicably connected with each other and mutually hold the common control signal and the individual control signals.

8 Claims, 27 Drawing Sheets

(56) References Cited

U.S. PATENT DOCUMENTS

| | | | |
|---|---|---|---|
| 2011/0050925 A1* | 3/2011 | Watanabe | 348/211.2 |
| 2012/0044373 A1* | 2/2012 | Shiozaki | G03B 35/08 348/218.1 |
| 2012/0113230 A1* | 5/2012 | Jin | 348/47 |
| 2012/0154550 A1* | 6/2012 | Takagi | H04N 5/23258 348/49 |

OTHER PUBLICATIONS

Written Opinion of the International Searching Authority dated Apr. 9, 2013.

Supplementary European Search Report dated Oct. 26, 2015 in corresponding European Patent Application No. 13769981.5.

* cited by examiner

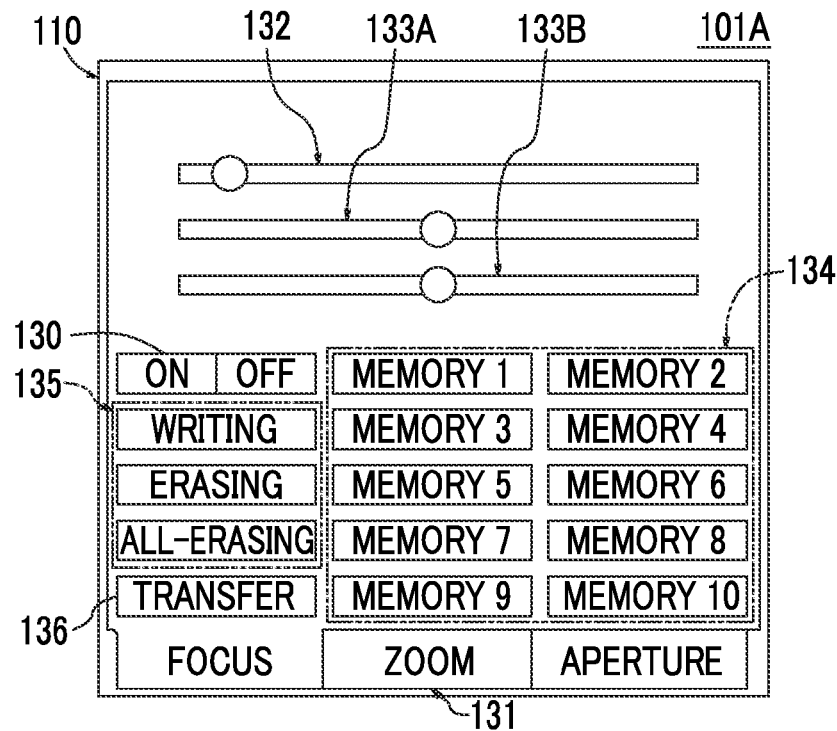
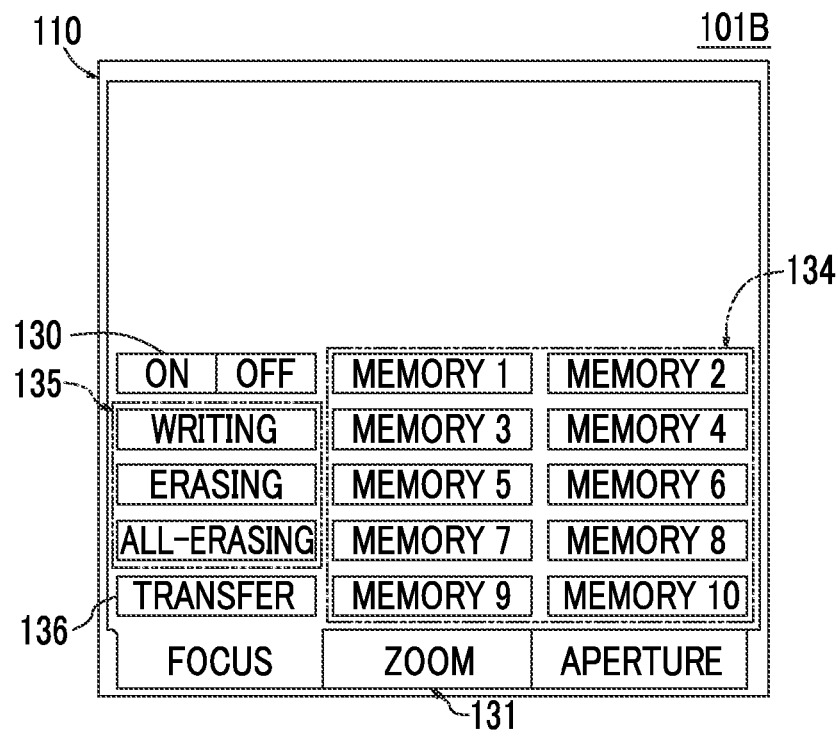

CORRECTION APPARATUS

CROSS REFERENCE TO RELATED APPLICATIONS

The present application is a Continuation of PCT International Application No. PCT/JP2013/057153 filed on Mar. 14, 2013, which claims priority under 35 U.S.C. §119(a) to Japanese Patent Application No. 2012-078108 filed on Mar. 29, 2012 and Japanese Patent Application No. 2012-078109 filed on Mar. 29, 2012. Each of the above applications is hereby expressly incorporated by reference, in its entirety, into the present application.

BACKGROUND OF THE INVENTION

1. Field of the Invention

The present invention relates to a correction apparatus of a plurality of lens apparatuses which configure a lens system used for stereoscopic imaging.

2. Description of the Related Art

In stereoscopic imaging which acquires subject images from multiple points of view using a plurality of imaging apparatuses, it is preferable that the optical conditions be matched for each of the lens apparatuses of the imaging apparatuses. Therefore, a lens system is known which is configured so as to synchronize control targets such as focus, zoom, or aperture which change the optical conditions between the lens apparatuses (for example, refer to JP1996-307906A (JP-H8-307906A) and JP1999-027702A (JP-H11-027702A)).

A dedicated controller for carrying out driving by synchronizing the focus or zoom of two lens apparatuses is provided in the lens system described in JP1996-307906A (JP-H8-307906A) and each of the lens apparatuses is connected with the controller. The controller transmits a control signal to each of the lens apparatuses according to the operation amount of the focus or ZOOM in an operation section which is provided in the controller and drives each of the lens apparatuses so as to match the focus or zoom with each other.

Then, the controller is provided with a volume switch which sets an adjustment amount for matching the focus or zoom of another lens apparatus by using the focus or zoom of one lens apparatus as a reference and a storage means which stores the adjustment amount which is set by the volume switch. The controller transmits a control signal according to the operation amount of the focus or zoom to the one lens apparatus which is set as a reference and then transmits a control signal, which adds the adjustment amount which is stored in the storage means to the operation amount of the focus or zoom to the other lens apparatus. Thus, deviation in the focus or the zoom between the two lens apparatuses is corrected.

In addition, the two lens apparatuses are connected with each other in the lens apparatus which is described in JP1999-027702A (JP-H11-027702A). A control signal which relates to zoom is input from the controller to the one lens apparatus and the lens apparatus operates in accordance with the control signal which is input and, additionally, transmits a control signal to the other lens apparatus. The other lens apparatus operates in accordance with the control signal which is received.

Then, the two lens apparatuses are connected with each other via a correction circuit and the correction circuit is provided with a volume switch which sets an adjustment amount for matching the zoom of another lens apparatus which receives the control signal with respect to the zoom of the one lens apparatus which transmits the control signal and a storage means which stores the adjustment amount which is set by the volume switch. The control signal which is transmitted from the one lens apparatus is transmitted to the other lens apparatus after adding the adjustment amount which is stored in the storage means in the correction circuit. Thus, deviation in the zoom between the two lens apparatuses is corrected.

SUMMARY OF THE INVENTION in the correction method of the plurality of lens apparatuses described in JP1996-307906A (JP-H8-307906A and JP1999-027702A (JP-H11-027702A), the plurality of lens apparatuses are connected with one correction device. Therefore, it is necessary to prepare various different types of dedicated correction devices according to the number of lens apparatuses which configure the lens system.

The present invention has been made in consideration of the circumstances described above and has an object of providing a correction apparatus which is able to flexibly respond to increases and decreases in a number of lens apparatuses where the correction is performed.

According to one aspect of the present invention, there is provided a correction apparatus for correcting a mismatch in at least one control target between a plurality of lens apparatuses when is common control signal for driving the control target is input to the plurality of lens apparatuses, the plurality of lens apparatuses being used in a state where the control target are synchronized therebetween, including a group of terminals which are connected in one-to-one correspondence with each of the plurality of lens apparatuses and which transmit the control signal for driving the control target of the lens apparatuses to the lens apparatuses connected therewith, wherein the group of terminals is configured so that each terminal of all of the group of terminals transmits, to the lens apparatus connected therewith, the common control signal for driving the control target of the lens apparatus, and so that each terminal of all of the group terminals or each terminal of other terminals than any one terminal of the group of terminals transmit, to the lens apparatus connected therewith, an individual control signal for driving the control target of the lens apparatus, and the group of terminals are communicably connected with each other and mutually hold the common control signal and the individual control signals.

According to another aspect of the present invention, there is provided a correction apparatus for correcting a mismatch in at least one control target between a plurality of lens apparatuses when a common control signal for driving the control target is input to the plurality of lens apparatuses, the plurality of leans apparatuses being used by in a state where the control target are synchronized therebetween, including a group of terminals which are connected in one-to-one correspondence with each of the plurality of lens apparatuses and which transmit the control signal for driving the control target of the lens apparatuses to the lens apparatuses connected therewith, wherein the group of terminals is configured so that each terminal of all the group of terminals transmits, to the lens apparatus connected therewith, an individual control signal for driving the control target of the lens apparatus, and the group of terminals are communicably connected with each other and mutually hold the common control signal and the individual control signals.

According to the present invention, it is possible to perform the correction in these lens apparatuses by flexibly responding to increases and decreases in the number of lens appara-

BRIEF DESCRIPTION OF THE DRAWINGS

FIG. 22A and FIG. 22B are schematic diagrams, each of which shows still another example of an operation screen which is displayed on the operation terminal which configures the correction apparatus in FIG. 11.

DESCRIPTION OF THE PREFERRED EMBODIMENTS

Figure 1:
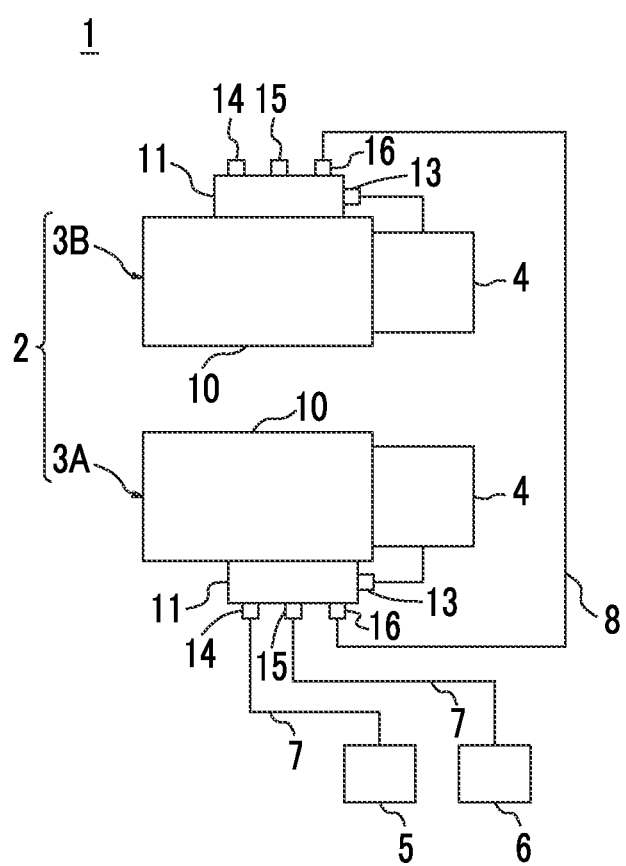
FIG. 1 is a schematic diagram for illustrating an embodiment of the present invention which shows a configuration of an example of a stereoscopic imaging system.

FIG. 1 shows an example of a stereoscopic in system for illustrating an embodiment of the present invention.

The stereoscopic imaging system 1 shown in FIG. 1 is provided with a lens system 2 which includes two lens apparatuses 3A and 3B and imaging apparatus bodies 4 which are mounted on each of the lens apparatuses 3A and 3B. Furthermore, the lens system 2 is configured to include a focus demand 5 for driving the focus of the two lens apparatuses 3A and 3B and a zoom demand 6 for driving the arm.

An imaging element such as a CCD imaging element, a signal processing circuit, or the like (none of which are shown in the figure) is mounted on the imaging apparatus body 4. The imaging apparatus body 4 photoelectrically converts an image which is formed by a lens apparatus which is mounted thereon, carries out a predetermined signal process with respect to an electrical signal which is obtained, and outputs the result as a image signal to an external device.

Both of the lens apparatuses 3A and 3B are lens apparatuses which are able to be used individually. Here, a detailed description will be given of the lens apparatus 3A later, but the lens apparatus 3A is a lens apparatus which has a function used for stereoscopic imaging. On the other hand, the lens apparatus 3B is a lens apparatus which does not have a function used for stereoscopic imaging. Here, except for the presence or absence of a function used for stereoscopic imaging, lens apparatuses with the same specifications with respect to the lens parameters such as focus, zoom, or aperture are typically used for the lens apparatuses 3A and 3B.

The focus demand 5 and the zoom demand 6 are connected with the lens apparatus 3A which has the stereoscopic imaging function described above via a connecting cable 7. The lens apparatus 3A and the lens apparatus 3B are connected with each other via a connecting cable 8.

Figure 2:
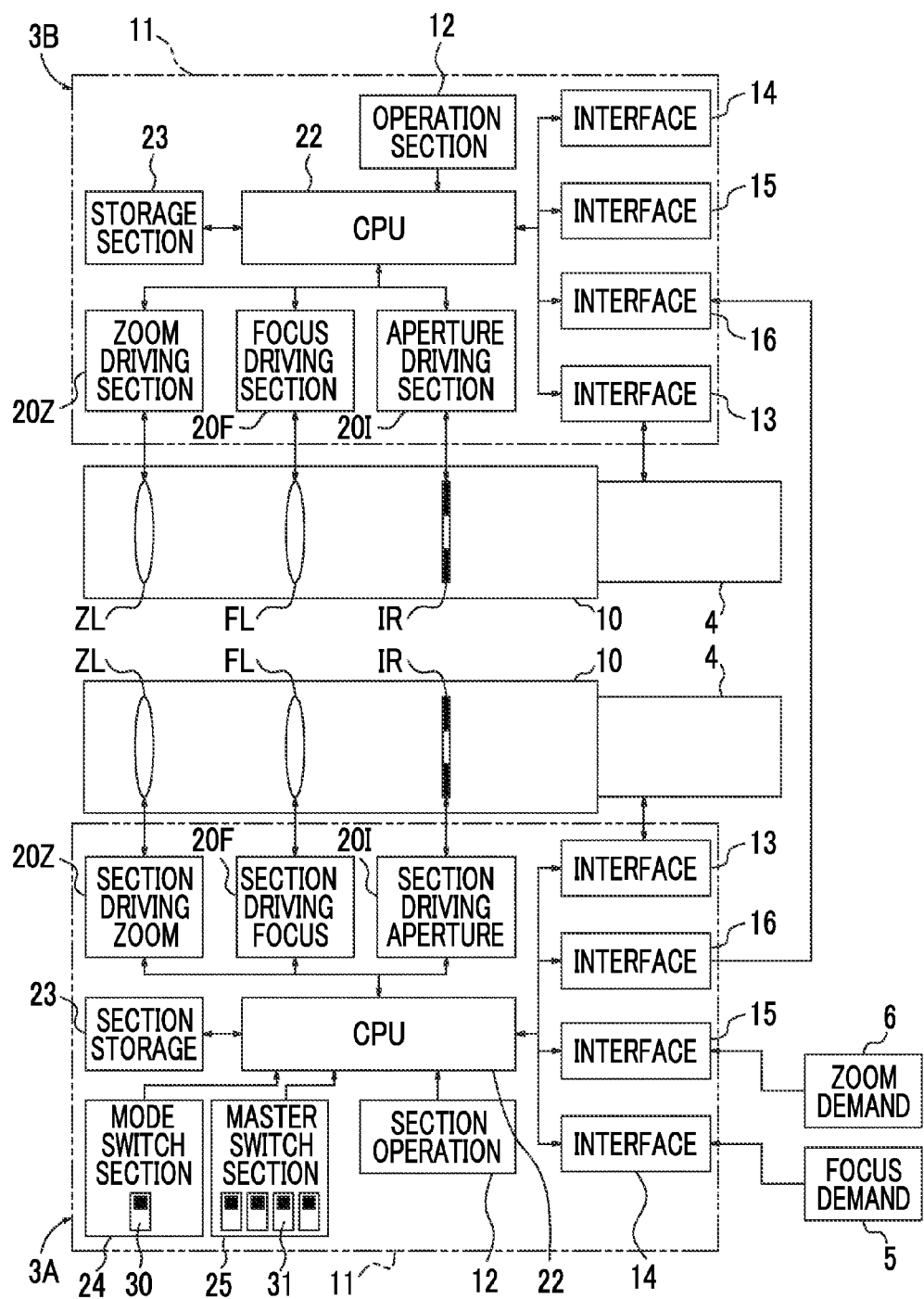
FIG. 2 is a schematic diagram which shows a configuration of a lens system which is used in the stereoscopic imaging system in FIG. 1 and a lens apparatus which is included in the lens system.

FIG. 2 shows a configuration of the lens system 2 and the lens apparatuses 3A and 3B which are included therein.

Firstly, a description will be given of the lens apparatus 3B which does not have a stereoscopic imaging function.

The lens apparatus 3B is mainly configured of an image forming optical system, a driving system, and a control system.

The image forming optical system of the lens apparatus 3B has optical elements such as a focus lens group FL, a zoom lens group ZL, and an aperture IR. The focus lens group FL or the zoom lens group ZL is able to move back and forth along an optical axis and a focus adjustment (adjust a distance to a subject) or a zoom adjustment (adjust a distance to a focus) is performed by the position of the focus lens group FL or the zoom lens group XL being adjusted. In addition, a light amount adjustment is performed by the aperture JR (a numerical aperture) being adjusted. These optical elements are accommodated in a lens barrel 10.

The driving system of the lens apparatus 3B has a focus driving section 20F which moves the focus lens group FL, a zoom driving section 20Z which moves the zoom lens group ZL, and an aperture driving section 20I which opens and closes the aperture IR. A motor, an amplifier which supplies electricity to the motor, an encoder which detects positions of elements which are driven by each of the driving sections, and the like are provided in each of the driving sections.

The control system of the lens apparatus 3B has a CPU 22 which controls operations of each of the sections of the lens apparatus 3B in a hatch and a storage section 23 which stores a program or the like which is executed by the CPU 22.

The driving system and the control system described above are provided in a drive unit 11 which is mounted on the outside periphery of the lens barrel 10.

An operation section 12 which includes a seesaw switch for driving the zoom of the lens apparatus 3B, a VTR switch for operating the start/stop of recording in the imaging apparatus body 4 on which the lens apparatus 3B is mounted, and the like is provided in the drive unit 11. Then, an interface 13, which is connected with the imaging apparatus body 4 when the lens apparatus 3B is mounted on the imaging apparatus body 4 and used, is provided in the drive unit 11.

The CPU 22 transmits a recording control signal from the interface 13 to the imaging apparatus body 4 according to the operation of the VTR switch which is included in the operation section 12. In addition, for example, an aperture control signal is input from the imaging apparatus body 4, which is connected with the interface 13, to the interface 13 in a case of using an automatic exposure control function which is put on the imaging apparatus body 4 and a focus control signal is input to the interface 13 in a case of Using an auto focus function which is put on the imaging apparatus body 4.

In addition, the drive unit 11 is provided with an interface 14 which is able to connect with the focus demand 5 for driving the focus of the lens apparatus 3B manually and an interface 15 which is able to connect with the zoom demand 6 for driving the zoom of the lens apparatus 3B which is separate from the seesaw switch of the operation section 12. A focus control signal according to the operation amount in the focus demand 5 is input to the interface 14 from the focus demand 5 which is connected with the interface 14. A zoom control signal according to the operation amount in the zoom demand 6 is input to the interface 15 from the zoom demand 6 which is connected with the interface 15.

In addition, an interface 16 to which an external device such as a personal computer is connected is provided in the drive unit 11. The external device which is connected with the interface 16 is used, for example, for driving the aperture, focus, zoom, or the like of the lens apparatus 3B which is separate from the imaging apparatus body 4, the focus demand 5, and the zoom demand 6.

It is possible to individually use the lens apparatus 3B which is configured as described above, by connecting the imaging apparatus body 4 with the interface 13 and using the operation section 12 which is provided in the drive unit 11 or by using the focus demand 5, the zoom demand 6, or an external device such as a personal computer which are respectively connected with corresponding interfaces.

For example, in a case where the lens apparatus 3B is use individually by using the operation section 12 of the drive unit 11, the aperture control signal and the focus control signal from the imaging apparatus body 4 and the zoom control signal from the seesaw switch of the operation section 12 are respectively input to the lens apparatus 3B. The CPU 22 acquires the aperture control signal, the focus control signal, or the zoom control signal, drives the aperture driving section 20I, the focus driving section 20F, or the zoom driving section 20Z based on a program which is stored in the storage section 23, and moves the aperture IR, the focus lens group FL, or the zoom lens group ZL to a target position.

In addition, in a case where the lens apparatus 3B is used individually by respectively connecting the focus demand 5 with the interface 14 and the zoom demand 6 with the interface 15, the aperture control signal from the imaging apparatus body 4, the focus control signal from the focus demand 5, and the zoom control signal from the zoom demand 6 are respectively input to the lens apparatus 3B. The CPU 22 acquires the aperture control signal, the focus control signal, or the zoom control Signal, drives the aperture driving section 20I, the focus driving section 20F, or the zoom driving section 20Z based on a program which is stored in the storage section 23, and moves the aperture IR, the focus lets group FL, or the zoom lens group ZL to a target position.

In addition, in a case where the lens apparatus 3B is used individually by connecting an external device such as a personal computer with the interface 16, the aperture control signal, the focus control signal, or the zoom control signal is input from the external device to the lens apparatus 3B. The CPU 22 acquires the aperture control signal, the focus control signal, or the zoom control signal, drives the aperture driving section 20I, the focus driving section 20F, or the zoom driving section 20Z in accordance with the control signal which is acquired based on a program which is stored in the storage section 23, and moves the aperture IR, the focus lens group FL, or the zoom lens group ZL to a target position.

For example, a serial communication method is used in the communication between the lens apparatus 3B and the focus demand 5, the zoom demand 6, the imaging apparatus body 4, or another external device and for example, RS-232, RS-485, or the like is used in the interfaces 13, 14, 15, and 16 which are connected with these devices.

In this manner, for example, with respect to the driving of the zoom in the lens apparatus 3B, the driving is possible using the seesaw switch of the operation section 12, the zoom demand 6 which is connected with the interface 15, and an external device which is connected with the interface 16. In a case where the external device which is connected with the interface 16 is used among those driving means, a slave operation mode is provided in which the driving of the zoom is carried out in accordance with the control signal which is input from the external device and in which the control signals which are input from the seesaw switch or the zoom demand 6 are invalid. In addition, the slave operation mode is also provided in the same manner with respect to driving of the focus or the aperture and a recording instruction to the imaging apparatus body 4.

When a mode switch signal is input which gives an instruction for switching to the slave operation mode from an external device to the driving of the zoom, the CPU 22 acquires the mode switch signal which is input and performs switching to the slave operation mode with respect to the driving of the zoom. After that, when a zoom control signal is input from an external device, the CPU 22 operates in accordance with the input zoom control signal with respect to the driving of the zoom.

In addition, a speed control which is superior in responsiveness is typically used with respect to the driving of the zoom and a zoom control signal which corresponds to the speed control is input from the seesaw switch of the operation section 12, the zoom demand 6 which is connected with the interface 15, or an external device which is connected with the interface 16; however, there are cases where a position control is used. Thus, the CPU 22 determines whether the zoom control signal which is input is a signal by the speed control or a signal by the position control and switches the driving control method of the zoom driving section 20Z to the speed control or the position control according to the determination result. Here, the position control is usually used with respect to the driving of the focus or the aperture.

The lens apparatus 3A is basically configured in the same manner as the lens apparatus 3B. However, the lens 3A is provided with, as functions used for stereoscopic imaging, an operation mode for individual use (referred to as an individual mode hereinafter) and an operation mode for use in synchronization with another lens apparatus (referred to below as a synchronizing mode hereinafter) when stereoscopic imaging is carried out. The lens 3A is also provided, with a mode switch section 24 which performs switching between both of the operation modes.

In addition, in the lens apparatus 3A, with respect to the control targets such as the focus, zoom, or aperture which are synchronized with another lens apparatus in the synchronizing mode described above, a master setting section 25 is provided which performs setting of whether or not the lens apparatus 3A is a master.

The mode switch section 24 is configured to include a dip switch 30, the CPU 22 detects a state of the dip switch 30, and, for example, the operation mode is set to the synchronizing mode in a case where the dip switch 30 is ON and the operation mode is set to the individual mode in a case where the dip switch 30 is OFF.

In the individual mode, as described above, it is possible to use the lens apparatus 3A individually by connecting the imaging apparatus body 4 with the interface 13 and using the operation section 12 which is provided in the drive unit 11 or by using the focus demand 5, the zoom demand 6, or an external device such as a personal computer which are respectively connected with corresponding interfaces. The operation of the CPU 22 at this time is the same as that of the CPU 22 of the lens apparatus 3B described above and description thereof will be omitted.

On the other hand, in the synchronizing mode, the lens apparatus 3A is connected with the lens apparatus 3B and synchronizes a control target such as the focus, the zoom, the aperture, or the recording timing with the lens apparatus 3B connected thereto. In the present lens system 2, the lens apparatus 3A and the lens apparatus 3B are connected with each other by linking the interfaces 16 to which the external device such as a personal computer is connected using the connecting cable 8 (refer to FIG. 1).

The master setting section 25 is configured to include a dip switch 31, the CPU 22 detects a state of the dip switch 31, and, for example, sets the lens apparatus 3A as the master in a case where the dip switch 31 is ON. The same number of dip switches 31 are provided in the lens apparatus 3A as the number of the control targets which are synchronized with another lens apparatus, and the dip switches 31 are respectively set for the control targets.

The present lens system 2 is configured of the two lens apparatuses 3A and 3B and since the other lens apparatus 3B does not have the function used for stereoscopic imaging described above, the lens apparatus 3A is set as the master with respect to the control targets which are synchronized between the lens apparatuses 3A and 3B in the present lens system 2. However, in a case where the lens system is configured using the lens apparatus 3A and a lens apparatus which has a function used for stereoscopic imaging in the same manner, there are cases where the other lens apparatus is set as the master instead of the lens apparatus 3A.

When the lens apparatus 3A is set as the master with respect to the focus, the zoom, the aperture, and the recording timing, the present lens system 2 is configured by the focus demand 5 being connected with the interface 14 of the lens apparatus 3A, the zoom demand 6 being connected with the interface 15, and the lens apparatus 3B being connected with the interface 16.

The CPU 22 of the lens apparatus 3A which is set as the master with respect to the control targets described above drives the focus of the lens apparatus 3A in accordance with the control signal which is input from the focus demand 5. In addition, the CPU 22 of the lens apparatus 3A drives the zoom of the lens apparatus 3A in accordance with the control signal which is input from the zoom demand 6. Furthermore, the CPU 22 of the lens apparatus 3A drives the aperture of the lens apparatus 3A in accordance with the control signal which is input from the imaging apparatus body 4 on which the lens apparatus 3A is mounted. Moreover, the CPU 22 of the lens apparatus 3A instructs the start/stop of the recording to the imaging apparatus body 4 on which the lens apparatus 3A is mounted according to the operation of the VTR switch which is provided in the operation section 12 of the lens apparatus 3A.

Then, the CPU 22 of the lens apparatus 3A, which is set as the master, transmits a mode switch signal from the interlace 16 to the lens apparatus 3B connected with the interface 16, which mode signal instructs switching to the slave operation mode which operates in accordance with only the control signal which is transmitted from the lens apparatus 3A with respect to the driving of the control targets described above in the lens apparatus 3B. Additionally, the CPU 22 of the lens apparatus 3B transmits the control signals for driving these control targets from the interface 16 to the lens apparatus 3B.

In a case where the lens apparatus 3A is not set as the master, that is, in a case where the lens system is configured using the lens apparatus 3A and a lens apparatus which has a function used for stereoscopic imaging in the same manner and the other lens apparatus is set as the master, the operation of the lens apparatus 3A is the same as that of the lens apparatus 3B.

For example, with respect to the driving of the zoom, a slave operation mode is provided which operates in accordance with the control signal which is input from the other lens apparatus which is connected with the interface 16 of the lens apparatus 3A and where the control signal is invalid in a case where the control signal is input from the seesaw switch or the zoom demand 6. In addition, the Slave operation mode is also provided in the same manner with respect to driving of the focus or the aperture and a recording instruction to the imaging apparatus body 4.

When a mode switch signal which instructs switching to the slave operation mode is input from the other lens apparatus with respect to the driving of the zoom, the CPU 22 performs switching to the slave operation mode with respect to the driving of the zoom. After that, when a zoom control signal is input from the other lens apparatus, the CPU 22 operates in accordance with the input zoom control signal with respect to the driving of the zoom.

Hereinafter, a description will be given of the operation of the lens system 2.

Figure 3:
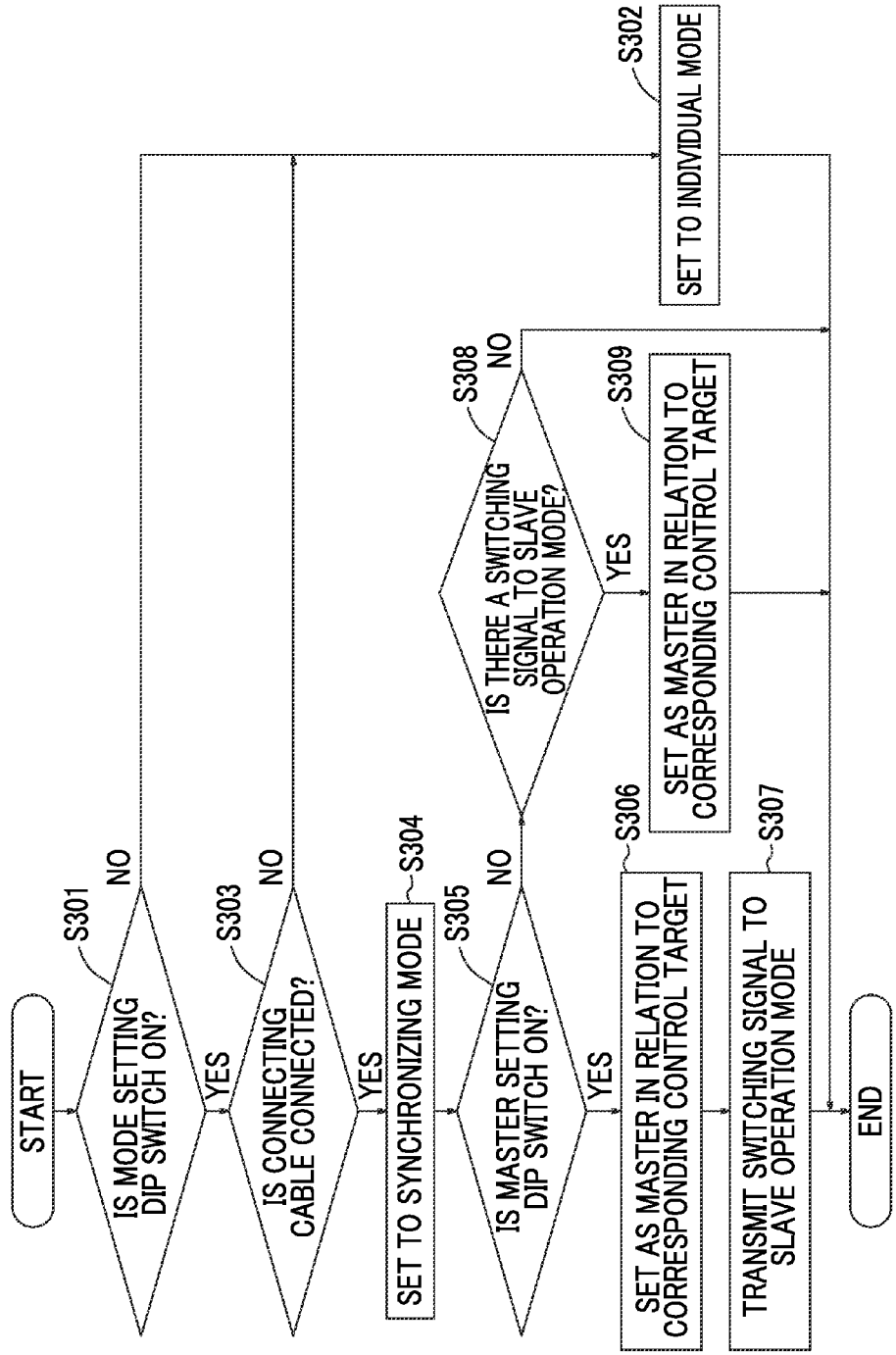
FIG. 3 is a flowchart which shows an operation of a lens apparatus which has a function used for stereoscopic imaging before the lens system in FIG. 2 is configured.

FIG. 3 shows an operation flow of the lens apparatus 3A before the lens system 2 is configured at the time of stereoscopic imaging.

Firstly, the CPU 22 of the lens apparatus 3A detects a state of the dip switch 30 which configures the mode switch section 24 and performs setting of the operation mode (Step S301).

In a case where the dip switch 30 is OFF, the CPU 22 sets the operation mode to the individual mode ((Step S302). The operation of the lens apparatus 3A in a case of being set to the individual mode is as described above.

In a case where the dip switch 30 is ON, the CPU 22 sets the operation mode to the synchronizing mode. Here, in a case where the dip switch 30 is ON, the operation mode may be immediately set to the synchronizing mode; however, the CPU 22 in the present example firstly performs confirmation of the connection with the lens apparatus 3B.

At the time of stereoscopic imaging where the synchronizing, mode is selected, the connecting cable 8 is connected with the interface 16 of the lens apparatus 3A and the lens apparatus 3A and the lens apparatus 3B are connected via the connecting cable 8. Here, the CPU 22 detects the connection of the connecting cable 8 with the interface 16 (Step S303).

In a case where the connection of the connecting cable 8 (that is, the connection with the lens apparatus 3B) is not detected, the CPU 22 sets the operation mode to the individual mode regardless of the state (ON) of the dip switch 30 (Step S302).

In a case where the connection of the connecting cable 8 with the interface 16 is detected, the CPU 22 sets the operation mode to the synchronizing mode (Step S304).

In a case of setting the operation mode of the lens apparatus 3A to the synchronizing mode, the CPU 22 subsequently detects a state of the dip switch 31 which configures the master setting section 25 and performs the setting of the master for each of the control targets which are synchronized between the lens apparatus 3A and the other lens apparatus (Step S305).

In a case were the dip switch 31 is ON, with respect to the driving of the control targets which correspond to the dip switch 31, the CPU 22 sets the lens apparatus 3A as the master (Step S306).

In a case of setting the lens apparatus 3A as the master, with respect to the driving of the control targets where the lens apparatus 3A is set as the master, the CPU 22 transmits a mode switch signal, which instructs switching the operation mode in the lens apparatus 3B which is connected with the interface 16 to the slave operation mode, from the interface 16 to the lens apparatus 3B (Step S307).

In the stereoscopic imaging below, the lens apparatus 3A operates as the master in the lens system 2.

In a case where the dip switch 31 is OFF, the CPU 22 does not set the lens apparatus 3A as the master with respect to the driving of the control targets which correspond to the dip switch 31.

In a case of not setting the lens apparatus 3A as the master, the CPU 22 detects the input of the mode switch signal to the interface 16 to which the lens apparatus 3B is connected (Step S308).

In a case where the input of the mode switch signal is detected, the CPU 22 switches the operation mode to the slave operation mode with respect to the driving of the control targets which correspond to the mode switch signal (Step S309).

In the stereoscopic imaging below, the lens apparatus 3A operates in accordance with the control signal which is input to the interface 16 by being transmitted from the lens apparatus 3B which is connected with the interface 16 with respect to the driving of the control targets described above.

Here, the present lens system 2 is configured by the two lens apparatuses 3A and 3B and since the other lens apparatus 3B does not have the function used for stereoscopic imaging described above, the lens apparatus 3A is set as the master with respect to all of the control targets which are synchronized between the lens apparatuses 3A and 3B.

Figure 4:
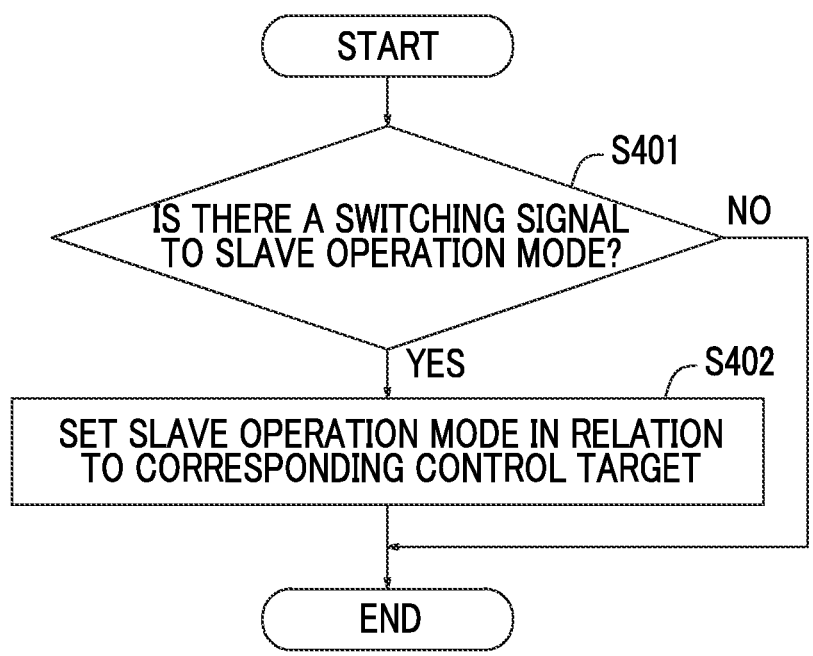
FIG. 4 is a flowchart which shows an operation of a lens apparatus which does not have a function used for stereoscopic imaging before the lens system in FIG. 2 is configured.

FIG. 4 shows an operation flow of the lens apparatus 3B before the lens system 2 is configured at the time of stereoscopic imaging.

The CPU 22 of the lens apparatus 3B detects the input of the mode switch signal to the interface 16 to which the lens apparatus 3A is connected (Step S401).

In a case where the input of the mode switch signal is detected, the CPU 22 switches the operation mode to the slave operation mode with respect to the driving of the control targets which correspond to the mode switch signal (Step S402).

In the stereoscopic imaging below, the lens apparatus 3B operates in accordance with the control signal which is input to the interface 16 by being transmitted from the lens apparatus 3A with respect to the driving of the control targets of the lens apparatus 3B which are synchronized between the lens apparatus 3B and the lens apparatus 3A.

Figure 5:
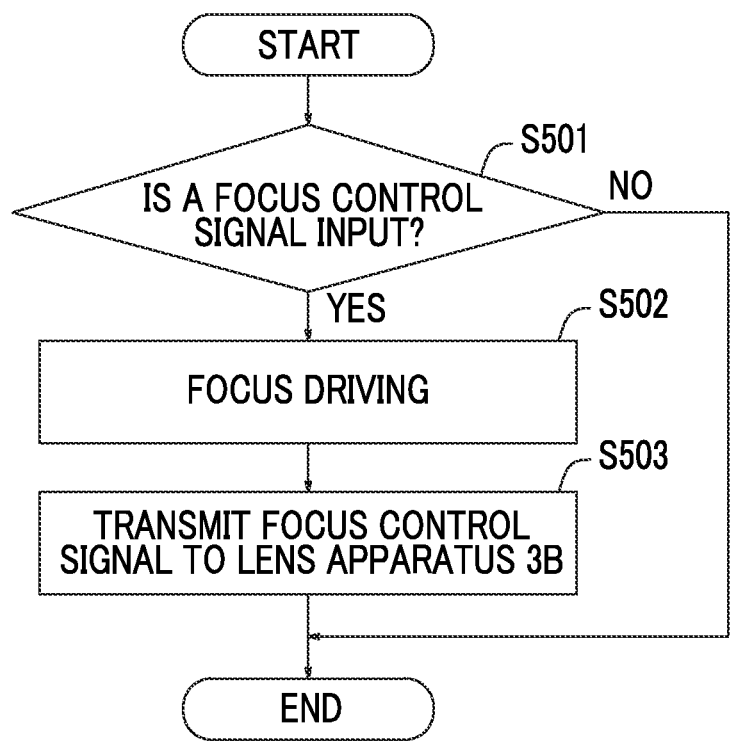
FIG. 5 is a flowchart which shows an operation of a lens apparatus which has a function used for stereoscopic imaging in a case of synchronizing focus in the lens system in FIG. 2.
Figure 6:
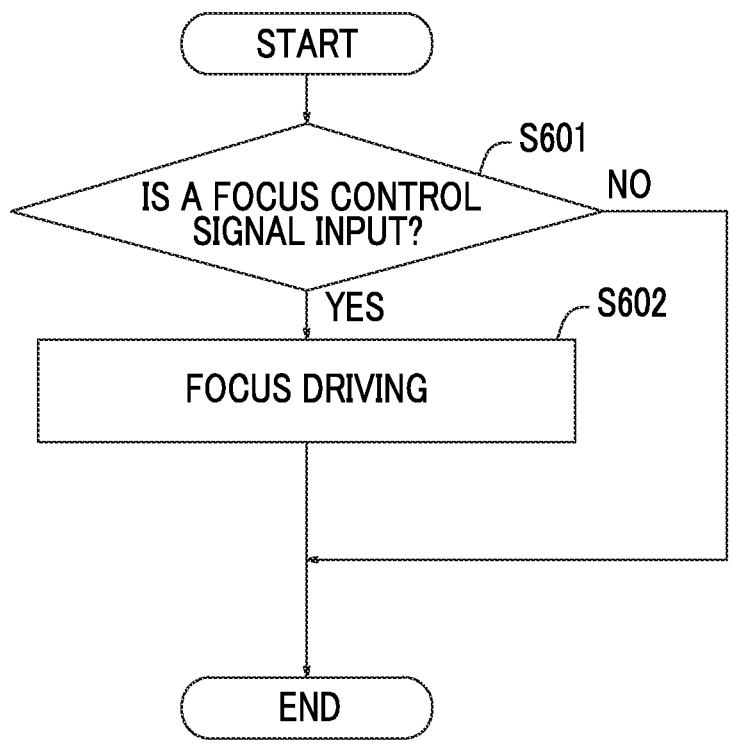
FIG. 6 is a flowchart which shows an operation of a lens apparatus which does not have a function used for stereoscopic imaging in a case of synchronizing focus in the lens system in FIG. 2.

FIG. 5 shows an operation flow of the lens apparatus 3A and FIG. 6 shows an operation flow of the lens apparatus 3B in a case of synchronizing the focus in the lens system 2.

Firstly, the CPU 22 of the lens apparatus 3A detects the input of the focus control signal from the focus demand 5 which is connected with the lens apparatus 3A (Step S501).

In a case where the input of the focus control signal is detected, the CPU 22 drives the focus of the lens apparatus 3A in accordance with the focus control signal (Step S502).

Then, the CPU 22 transmits the focus control signal for driving the focus of the lens apparatus 3B so as to match the focus of the lens apparatus 3B with the focus of the lens apparatus 3A, from the interface 16 to the lens apparatus 3B (Step S503).

Since the lens apparatuses 3A and 3B are configured with the same specifications also including the lens parameters such as focus, zoom, or aperture, except for the presence or absence of the function used for stereoscopic imaging described above, it is possible for the focus control signal which is transmitted from the lens apparatus 3A to the lens apparatus 3B to be the same as the focus control signal for driving the focus of the lens apparatus 3A, that is, to be the focus control signal which is input from the focus demand 5 to the lens apparatus 3A.

On the other hand, the CPU 22 of the lens apparatus 3B detects the input of the focus control signal from the lens apparatus 3A (Step S601).

In a case where the input of the focus control signal is detected, the CPU 22 drives the focus of the lens apparatus 3B in accordance with the focus control signal (Step S602).

Thus, a state is obtained where the focus of the lens apparatus 3B matches the focus of the lens apparatus 3A.

Figure 7:
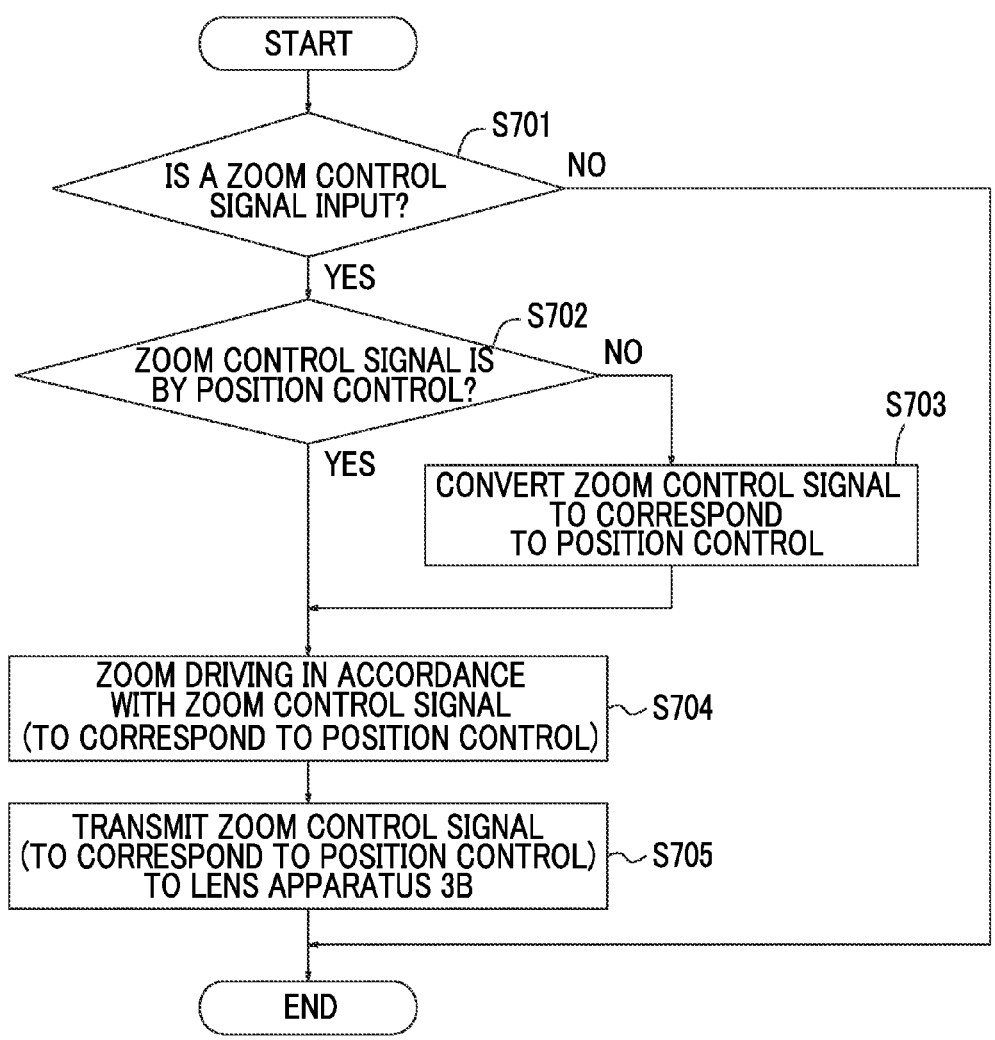
FIG. 7 is a flowchart which shows an operation of a lens apparatus which has a function used for stereoscopic imaging in a case of synchronizing zoom in the lens system in FIG. 2.
Figure 8:
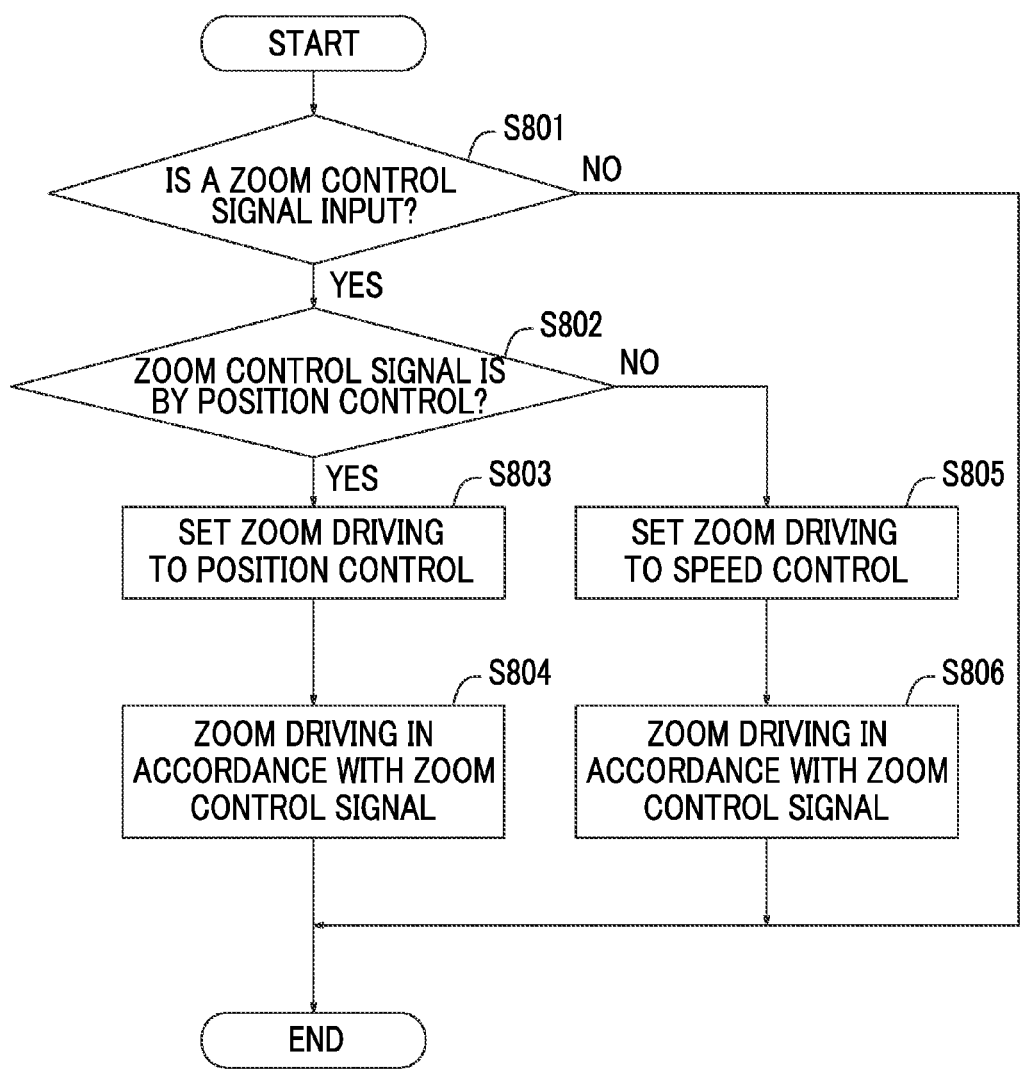
FIG. 8 is a flowchart which shows an operation of a lens apparatus which does not have a function used for stereoscopic imaging in a case of synchronizing zoom in the lens system in FIG. 2.

FIG. 7 shows an operation flow of the lens apparatus 3A and FIG. 8 shows an operation flow of the lens apparatus 3B in a case of synchronizing the zoom in the lens system 2.

Firstly, the CPU 22 of the lens apparatus 3A detects the input of the zoom control signal from the zoom demand 6 which is connected with the lens apparatus 3A (Step S701).

In a case where the input of the zoom control signal is detected, the CPU 22 determines whether the zoom control signal is a signal according to the speed control or a signal according to the position control (Step S702).

In a case of determining that the zoom control signal is a signal according to the speed control, the CPU 22 carries out conversion into the zoom control signal which corresponds to the position control by integration of the signal according to the speed control (Step S703) and drives the zoom of the lens apparatus 3A in accordance with the converted zoom control signal according to the position control (Step S704).

In addition, in a case where it is determined that the zoom control signal is a signal according to the position control, the CPU 22 drives the zoom of the lens apparatus 3A according to the zoom control signal which is input (Step S704).

Then, the CPU 22 transmits the zoom control signal for driving the zoom of the lens apparatus 3B so as to match the zoom of the lens apparatus 3B with the zoom of the lens apparatus 3A, from the interface 16 to the lens apparatus 3B (Step S705).

In a case where the zoom control signal which is input from the zoom demand 6 to the lens apparatus 3A is a signal according to the speed control, the zoom control signal which is transmitted from the lens apparatus 3A to the lens apparatus 3B is as zoom control signal which is converted so as to correspond to the position control and additionally, in a case where the zoom control signal which is input from the zoom demand 6 to the lens apparatus 3A is a signal according to the position control, the zoom control signal which is transmitted from the lens apparatus 3A to the lens apparatus 3B is the zoom control signal which is input.

On the other hand, the CPU 22 of the lens apparatus 3B detects input of the zoom control signal from the lens apparatus 3A (Step S801).

In a case where the input of the zoom control signal is detected, the CPU 22 determines whether the zoom control signal is a signal according to the speed control or a signal according to the position control (Step S802).

Here, since the zoom control signal is a position control signal, the CPU 22 switches the driving control method of the zoom driving section 20Z to position control (Step S803) and drives the zoom in accordance with the zoom control signal which is input (Step S804).

Here, in a case where the zoom control signal is a speed control signal, the CPU 22 switches the driving control method of the zoom driving section 20Z to speed control (Step S805) and drives the zoom in accordance with the zoom control signal which is input (Step S806).

In a case where the lens apparatuses 3A and 3B are used individually, the speed control is typically used for the zoom control; however, it is possible to drive the zoom of both of the lens apparatuses 3A and 3B without mismatches by setting the position control as described above when the zoom is synchronized between both of the lens apparatuses 3A and 3B.

Regarding the operation of the lens apparatuses 3A and 3B in a case of synchronizing the aperture, the driving of the aperture in the lens apparatuses 3A and 3B is performed by position control in the same manner as the driving of the focus and is the same as that of the case of synchronizing the focus except thr the point that the aperture control signal is input to the lens apparatus 3A from the imaging apparatus body 4 on which the lens apparatus 3A is mounted.

Figure 9:
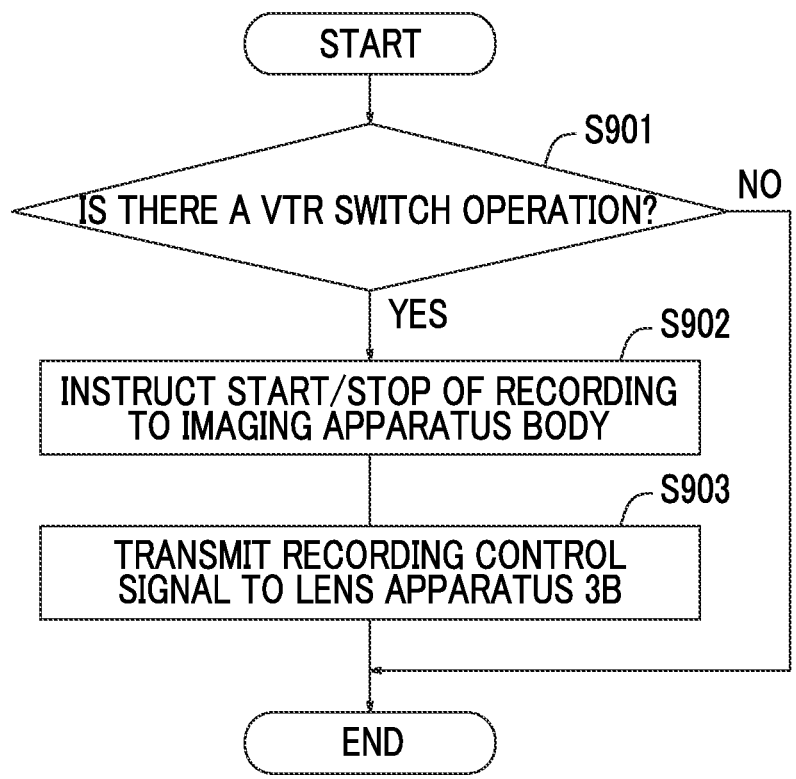
FIG. 9 is a flowchart which shows an operation of a lens apparatus which has a function used for stereoscopic imaging in a case of synchronizing a VTR switch in the lens system in FIG. 2.
Figure 10:
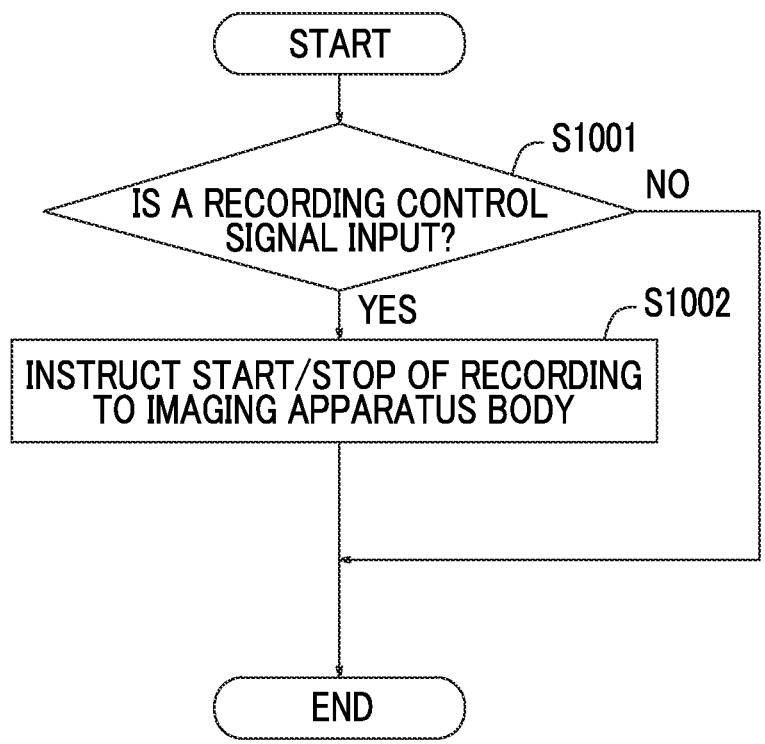
FIG. 10 is a flowchart which shows an operation of a lens apparatus which does not have a function used for stereoscopic imaging in a case of synchronizing a VTR switch in the lens system in FIG. 2.

FIG. 9 shows an operation flow of the lens apparatus 3A and FIG. 10 shows an operation flow of the lens apparatus 3B in a case of synchronizing the VTR switch in the lens system 2.

Firstly, the CPU 22 of the lens apparatus 3A detects an operation of the VTR switch which is provided in the operation section 12 of the lens apparatus 3A (Step S901).

In a case where the operation of the VTR switch is detected, the CPU 22 instructs the start/stop of recording to the imaging apparatus body 4 on which the lens apparatus 3A is mounted according to the operation (Step S902).

Then, the CPU 22 transmits the recording control signal for matching the start/stop of the recording in the imaging apparatus body 4 on which the lens apparatus 3B is mounted with the start/stop of the recording in the imaging apparatus body 4 on which the lens apparatus 3A is mounted, from the interface 16 to the lens apparatus 3B (Step S903).

On the other hand, the CPU 22 of the lens apparatus 3B detects the input of the recording control signal from the lens apparatus 3A (Step S1001).

In a case where the input of the recording control signal is detected, the CPU 22 instructs the start/stop of the recording to the imaging apparatus body 4 on which the lens apparatus 3B is mounted in accordance with the recording control signal (Step S1002).

Thus, a state is obtained where the start/stop of the recording is synchronized in both of the imaging apparatus bodies 4.

In the operation of the above lens apparatuses 3A and 3B in the present lens system 2, the lens apparatus 3A which has a function used for stereoscopic imaging instructs the lens apparatus 3B so as to operate in accordance with the control signal which is transmitted from the lens apparatus 3A with respect to the driving of the control targets where master setting is carried out only in a case where the lens apparatus 3A itself is set as the master at the time of the stereoscopic imaging.

For example, in the lens apparatus 3A, in a case where the setting of the master is carried out with respect to the focus, the zoom and the recording timing and the setting of the master is not carried out with respect to the aperture, the lens system 2 is configured such that an aperture control signal is input to each of the lens apparatuses 3A and 3B from the imaging apparatus body 4 on which the lens apparatus is mounted according to an automatic exposure control function with respect to the aperture and the aperture is driven in accordance with the aperture control signal which is input in each of the lens apparatuses 3A and 3B.

Thus, as the other lens apparatus which configures the lens system 2 along with the lens apparatus 3A, the conventional lens apparatus 3B is used, which does not have a function of stereoscopic imaging, i.e., which does not have a function of serving as the master with respect to the control targets which the lens apparatus 3A is able to synchronize with the other lens apparatus. Furthermore, it is also easy to configure a lens system with three or more lens apparatuses including the lens apparatus 3A.

In the above, the description has been given to the case where the same number of the dip switches 31 are provided in the master setting section 25 in the lens apparatus 3A as the number of the control targets in the lens apparatus 3A which are able to synchronize with the other lens apparatus and the setting of the master is carried out individually for each of the control targets; however, the setting of the master may be carried out in a batch with respect to all of the control targets using cite dip switch 31. Thus, the setting is easily performed compared to a case of performing the setting of the master for each of the control targets and additionally, it is possible to prevent omission of the setting of the master. Furthermore, in a case where the lens system is configured using the lens apparatus 3A and a lens apparatus which has a function used for stereoscopic imaging in the same manner, it is possible to reduce the possibility of a competition in the setting of the master between the lens apparatus 3A and the other lens apparatus.

Further, in the above, the description has been given to the case where the setting of the master in the lens apparatus 3A is performed using the dip switch 31; however, for example, with respect to the driving of the focus or the zoom, the lens apparatus 3A may be set as the master by the connection of the focus demand 5 or the zoom demand 6 with the lens apparatus 3A. That is, the CPU 22 of the lens apparatus 3A may detect the connection of the focus demand 5 with the interface 14 and may set the lens apparatus 3A as the master with respect to the driving of the focus in a case where it detects the connection. Also, in the same manner, the CPU of the lens apparatus 3A may detect the connection of the zoom demand 6 with the interface 15 and may set the lens apparatus 3A as the master with respect to the driving of the zoom in a case where it detects the connection. In this case, the setting of the master may be carried out in a batch with respect to all of the control targets which are able to synchronize with the other lens apparatus in the lens apparatus 3A by either of the focus demand 5 or the zoom demand 6 being connected with the lens apparatus 3A.

In the above, the description has been given of the basic operation of the lens apparatuses 3A and 3B in the lens system 2. Although the description has been given to the case where the lens apparatuses 3A and 3B in the lens system 2 have the same specifications with respect to the lens parameters such as the focus, the zoom, or the aperture except for the presence or absence of the function used for stereoscopic imaging; the deviation in the driving of the focus, the zoom or the aperture with respect to the common control signal may occur between the lens apparatuses 3A and 3B due to individual differences and the like in the lens apparatuses 3A and 3B. In addition, in a case where the specifications of the lens apparatuses 3A and 3B are different, the deviation in the driving of the focus, the zoom, or the aperture with respect to the common control signal may occur. Thus, a description will be given below of a configuration for correcting deviation between the lens apparatuses 3A and 3B with respect to the common control signal with respect to the focus, the zoom, or the aperture.

Figure 11:
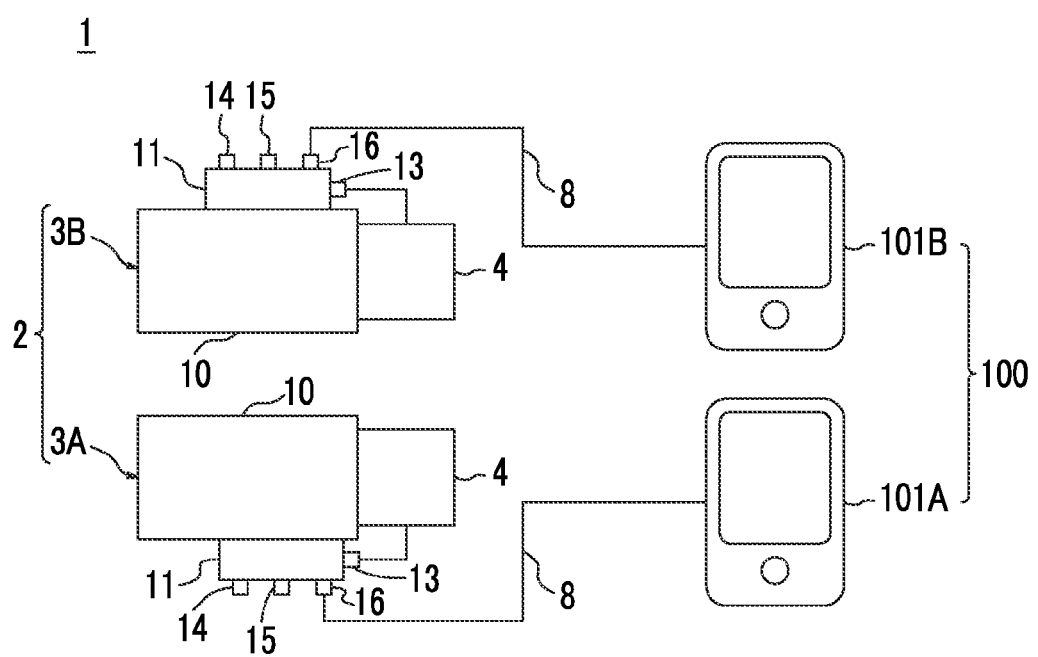
FIG. 11 is a schematic diagram which shows a configuration of an example of a correction apparatus for correcting mismatches in control targets which are synchronized between lens apparatuses which configure the lens system in FIG. 2.

FIG. 11 shows an example of a configuration of a correction apparatus for correcting mismatches in the control targets which are synchronized between the lens apparatuses 3A and 3B.

A correction apparatus 100 shown in FIG. 11 is provided with a plurality of operation terminals which are connected respectively with the plurality a lens apparatuses which configure the lens system 2. In the example shown in the figure, the correction apparatus 100 is provided with an operation terminal 101A which is connected with the lens apparatus 3A and an operation terminal 101B which is connected with the lens apparatus 3B.

The operation terminal 104A is connected with the interface 16 which is able to connect with an external device in the lens apparatus 3A via the connecting cable 8. In the same manner, the operation terminal 101B is connected with the interface 16 which is able to connect with an external device in the lens apparatus 3B via the connecting cable 8. Then, the operation terminal 101A and the operation terminal 101B are configured to be able to communicate with each other.

Figure 12:
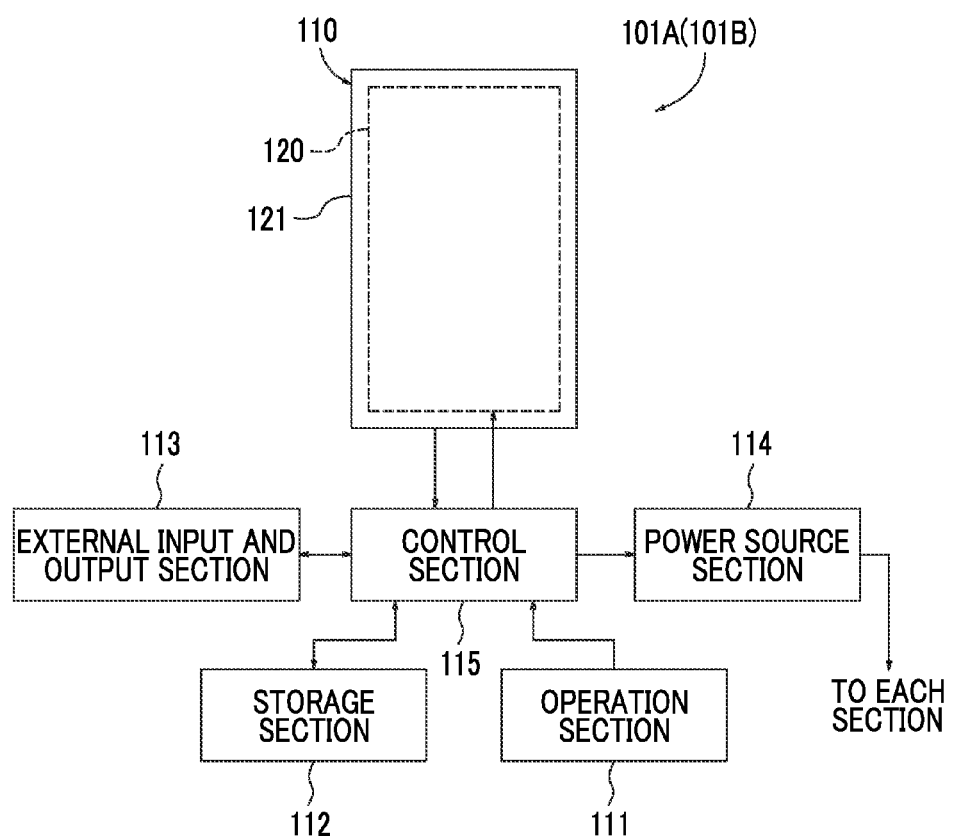
FIG. 12 is a functional block diagram of main sections of the correction apparatus in FIG. 11.

FIG. 12 shows a functional block of main sections of the operation terminals 101A and 101B.

As shown in FIG. 12, each of the operation terminals 101A and 101S is provided with a display input section 110, an operation section 111, a storage section 112, an external input, and output section 113, a power source section 114, and a control section 115 as main configuration elements.

The display input section 110 visually transmits information to a user by displaying images (static images or moving images), character information, or the like and detects a user operation with respect to the information which is displayed, and is a so called touch panel which is configured to include a display panel 120 and an operation panel 121.

For example, a liquid crystal display (LCD), an organic electro-luminescence display (OELD), or the like is used as the display panel 120.

The operation panel 121 is mounted on the display panel 120 such that it is possible to view an image which is displayed on the display surface of the display panel 120 and detects one or a plurality of coordinates which are operated by a finger of the user or a stylus.

When the operation by a finger of the user or a stylus is carried out on the operation panel 121, the operation panel 121 outputs a detection signal, which is generated due to the operation, to the control section 115. The control section 115 calculates the operation position (coordinates) on the display panel 120 based on the detection signal which is received and executes a process according to the information which is displayed on the operation position.

The operation section 111 is a set of hardware keys where key switches or the like are used and receives instructions from the user and examples thereof include a switch and the like for switching the main power source of the operation terminals 101A and 101B to ON/OFF.

The storage section 112 stores a control program or control data of the control section 115 in addition to application software which is executed by the control section 115. The storage section 112 is realized using a recording medium such as, for example, a Random Access Memory (RAM) and a Read Only Memory (ROM).

The external input and output section 113 fulfils a role of an interface which performs communication with all of the external devices which are connected with the operation terminals 101A and 101B by wired communication such as RS-232, RS-485 or Universal Serial Bus (USB) or wireless communication such as Bluetooth (a registered trademark) or Infrared Data Association (IrDA) (a registered trademark).

In the present example, the operation terminal 101A connects the lens apparatus 3A with the external input and output section 113 via the connecting cable 8. In addition, the operation terminal 101B connects the lens apparatus 3B with the external input and output section 113 via the connecting cable 8. Then, the operation terminals 101A and 101B are connected with each other by wireless communication in the external input and output sections 113 thereof.

The power source section 114 is configured to include, for example, a battery or the like and supplies electricity to each of the sections of the operation terminals 101A and 101B.

The control section 115 is configured to include, for example, a microprocessor, operates in accordance with the control program, the control data, or the application software which are stored in the storage section 112, and controls each of the sections of the terminals 101A and 101B in a batch. For example, the control section 115 performs display control for the display panel 120, operation detection control which detects a user operation through the operation section 111 or the operation panel 121, and communication control with external devices via the external input and output section 113.

In the present example, the correction process for correcting the deviation between the lens apparatuses 3A and 3B is described in detail later, but is realized by application software for correction.

For example, smartphones may be preferably used as the operation terminals 101A and 101B which are provided with the configuration described above. Since smartphones have become remarkably widespread in recent years and are also excellent in portability, it is possible to easily correct the lens apparatuses 3A and 3B anywhere by using smartphones as the operation terminals 101A and 101B, and it is possible to increase convenience.

Figure 13A:
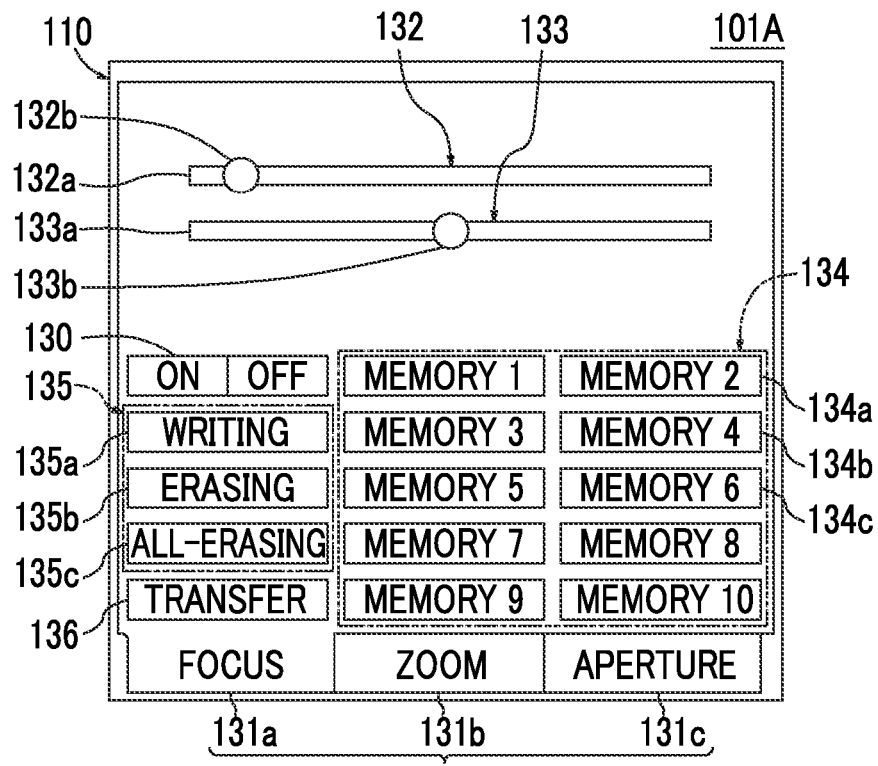
FIG. 13A and FIG. 13B are schematic diagrams, each of which shows an example of an operation screen which is displayed on an operation terminal which configures the correction apparatus in FIG. 11.
Figure 13B:
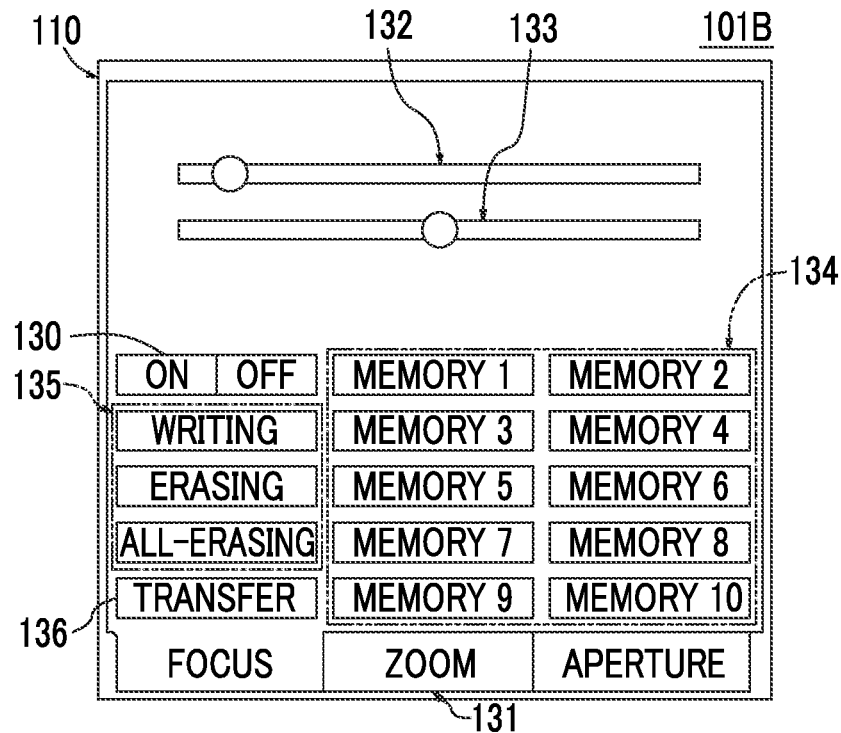

FIGS. 13A and 13B shows an example of the operation screens which are displayed on the display input sections 110 of the operation terminals 101A and 101B when the application software for correction is executed.

In the example shown in FIG. 13A, the operation screen which is displayed on the display input section 110 of the operation terminal 101A is mainly configured of a slide switch 130, a switching tab 131, slider bars 132 and 133, a memory button group 134, an action button group 135, and a transfer button 136 (FIG. 13A).

In the present example, the operation screen which is displayed on the display input section 110 of the operation terminal 101B is configured in the same manner as the operation screen which is displayed on the display input section 110 of the operation terminal 101A and is mainly configured of the slide switch 130, the switching tab 131, the slider bars 132 and 133, the memory button group 134, the action button group 135, and the transfer button 136 (FIG. 13B).

The slide switch 130 is for instructing the establishment and disconnection of communication between the operation terminals 101A and 101B and is moved between an ON position which instructs the establishment of the communication and an OFF position for instructing the disconnection of the communication which is established by a dragging operation being carried out in a state where a finger of the user or a stylus is on the slide switch 130.

When the slide switch 130 is moved to the ON position by a user operation in any of the operation terminals, a process for establishing the communication between the operation terminals 101A and 101B is executed in each of these operation terminals. In addition, when the slide switch 130 is moved to the OFF position by a user operation in any of the operation terminals, a process for disconnecting the communication which is established between the operation terminals 101A and 101B is executed in each of these operation terminals.

The switching tab 131 is for selecting a control target (referred to below as a correction control target) of which correction is to be performed from the focus, the room, and the aperture which are synchronized between the lens apparatuses 3A and 3B. The switching tab 131 is configured to include a focus tab 131a for selecting focus, a room tab 131b for selecting room, and an aperture tab 131c for selecting aperture, as the correction control target.

In a case where a communication is established between the operation terminals 101A and 101B, when, for example, the foals tab 131a is selected by a user operation in either one of the operation terminals 101A and 101B, as process for setting the correction control target to the focus is executed in each of the operation terminals 101A and 101B. In cases where the zoom tab 131b and the aperture tab 131c are selected, the process is executed in the same manner.

The slider bar 132 is for setting a common target value with respect to the correction control targets of the lens apparatuses 3A and 3B.

The slider bar 132 is configured to include a bar 132a which shows an operational range of the correction control target and a slider 132b which shows the target value according to the position on the bar 132a.

The bar 132a shows, for example, a range from a "Near" (close mange) end to an "Inf" (infinity) end in a case where the correction control target is the focus. In addition, the bar 132a shows, for example, a range from a "Wide" (a wide angle) end to a "Tele" (a telescope) end in a case where the correction control target is the zoom. Furthermore, the bar 132a shows, for example, a range from a minimum aperture end to an opening end in a case where the correction control target is the aperture.

Although not shown in the figure, an electrically erasable programmable read only storage (EEPROM) which stores information in relation to the movable range of the focus, the zoom or the aperture is provided in the lens apparatuses 3A and 3B. The operation terminal 101A acquires each of the movable ranges of the focus, the zoom, or the aperture from the EEPROM of the lens apparatus 3A which is connected when the application software for correction is executed. The operation terminal 101B acquires each of the movable ranges of the focus, the zoom, or the aperture from the EEPROM of the lens apparatus 3B which is connected when the application software for correction is executed. The operation terminals 101A and 101B assign the acquired movable ranges in relation to the correction control targets of the lens apparatuses 3A and 3B to the bar 132a.

In addition, in the case where the lens apparatuses 3A and 3B have the same specifications with respect to the lens specifications such as focus, zoom, or aperture except for the presence or absence of the function used for stereoscopic imaging, the movable ranges thereof are fundamentally the same; however, in a case where the lens apparatuses 3A and 3B have different specifications with respect to the lens parameters such as focus, zoom or aperture, there are cases where the movable ranges thereof are different. Thus, for example, regarding the focus, when the end at the furthermost Near side out of the Near ends of each of the focuses of the lens apparatuses 3A and 3B is the lower limit and the end at the furthermost Inf side out of the Inf ends is the upper limit, the ranges from the lower limits to the upper limits may be assigned to each of the bars 132a of the operation terminals 101A and 101B.

The slider 132b is moved, along the bar 132a by a dragging operation being carried out along the bar 132a in a state where a finger of the user or a stylus is on the slider 132b.

In a case where communication is established between the operation terminals 101A and 101B and the slider 132b is moved by a user operation in either of the operation terminals 101A and 101B, the position information, of the slider 1321, is transmitted to the other operation terminal. In the other operation terminal, the slider 132b is moved based on the received, position information regardless of the user operation. Thus, synchronization of the position of the slider 132*b* on the bar 132*a* is obtained between the operation terminals 101A and 101B, and the common target value is set with respect to the correction control targets of the lens apparatuses 3A and 3B.

Then, the operation terminal 101A transmits a control signal for driving the correction control target of the lens apparatus 3A to the target value which is set in the slider bar 132 thereof to the lens apparatus 3A. In parallel, the operation terminal 101B transmits a control signal for driving the correction control signal of the lens apparatus 3B to the target value which is set in the slider bar 132 thereof to the lens apparatus 3B. That is, the correction apparatus 100 is configured such that it is possible to transmit a common control signal to the lens apparatuses 3A and 3B and drive the correction control targets of the lens apparatuses 3A and 3B in a batch.

The slider bar 133 is for setting an individual correction value with respect to the correction control targets of the lens apparatuses 3A and 3B. That is, the slider bar 133 which is displayed on the display input section 110 of the operation terminal 101A sets a correction value with respect to the correction control target of the lens apparatus 3A to which the operation terminal 101A is connected. In addition, the slider bar 133 which is displayed on the display input section 110 of the operation terminal 101B sets a correction value with respect to the correction control target of the lens apparatus 3B to which the operation terminal 101B is connected.

With respect to the correction control target of the lens apparatus 3A to which the operation terminal 101A is connected, the slider bar 133 of the operation terminal 101A is configured to include a bar 133*a* which shows the correctable range and a slider 133*b* which shows a correction value according to the position on the bar 133*a*.

The bar 133*a* is assigned with a predetermined range of which center is at the target value which is set in the slider bar 132, for example.

The slider 133*b* is moved, along the bar 133*a* by a dragging operation being carried out along the bar 133*a* in a state where a finger of the user or a stylus is on the slider 133*b*.

With respect to the correction control target of the lens apparatus 3B to which the operation terminal 101B is connected, the slider bar 133 of the operation terminal 101B is configured to include the bar 133*a* which shows the correctable range and the slider 133*b* which shows the correction value according to the position on the bar 133*a*.

For example, the bar 133*a* is assigned with a predetermined range of which center is at a target value which is set in the slider bar 132.

The slider 133*b* is moved along the bar 133*a* by a dragging operation being carried out along the bar 133*a* in a state where a finger of the user or a stylus is on the slider 133*b*.

The position of the slider 133*b* on the bar 133*a* in the operation terminal 101A and the position of the slider 133*b* on the bar 133*a* in the operation terminal 101B are not synchronized with each other and thus, individual correction values are set with respect to the correction control targets of the lens apparatuses 3A and 3B.

In a case where the correction value is set in the slider bar 133 of the operation terminal 101A the operation terminal 101A transmits, to the lens apparatus 3A, a control signal for driving the correction control target of the lens apparatus 3A to a control value obtained by adding the correction value which is set in the slider bar 133 to the target value which is set in the slider bar 132. In the same manner, in a case where the correction value is set in the slider bar 133 of the operation terminal 101B, the operation terminal 101B transmits, to the lens apparatus 3B, a control signal for driving the correction control target of the lens apparatus 3B to a control value obtained by adding the correction value which is set in the slider bar 133 to the target value which is set in the slider bar 132. That is the correction apparatus 100 is configured such that it is also possible to transmit individual control signals to each of the lens apparatuses 3A and 3B and drive the correction control targets of the lens apparatuses 3A and 3B individually.

The memory button group 134 is for selecting any of a plurality of storage regions which are secured in the storage section 112 (refer to FIG. 12) in order to store the target values which are set in the slider bar 132 and the correction values which are set in the slider bar 133.

The memory button group 134 is configured to include a plurality of memory buttons 134*a*, 134*b*, 134*c* . . . . The predetermined storage regions are respectively assigned to the memory buttons 134*a*, 134*b*, 134*c* . . . .

In a case where communication is established between the operation terminals 101A and 101B, when, for example, the memory button 134*a* is pressed according to a user operation in either of the operation terminals, a process where a storage region which is a target of the subsequent storage process is set as a storage region which is assigned to the memory button 134*a* is executed in each of the operation terminals 101A and 101B. In the cases where the other memory buttons 134*b*, 134*c*, . . . are selected, the processing is executed in the same manner.

The action button group 135 is for instructing a memory process such as writing or erasing in the storage region which is selected in the memory button group 134.

The action button group 135 is configured to include a writing button 135*a* which instructs writing to the storage region which is selected in the memory button group 134, an erasing button 135*b* which instructs erasing of the storage region which is selected, and an all-erasing button 135*c* which instructs erasing all of the storage regions.

In a case where communication is established between the operation terminals 101A and 101B, when the writing button 135*a* is pressed according to a user operation in either of the operation terminals, a process which writes a set of the common target values in the slider bar 132, the correction value in the slider bar 133 of the operation terminal 101A, and the correction value in the slider bar 133 of the operation terminal 101B to the selected storage region is executed in each of the operation terminals 101A and 101B. In addition, when the erasing button 135*b* or the all erasing button 135*c* is pressed in either of the operation terminals 101A and 101B, a process which erases the storage region which is selected or all of the storage regions is executed in each of the operation terminals 101A and 101B.

The transfer button 136 is for transmitting correction data formed of a group of sets of the target value and the correction values described above for each of the control targets (focus, zoom, and aperture) which are stored in the storage regions which are respectively assigned to the memory buttons 134*a*, 134*b*, 134*c*, . . . to the storage section 23 (refer to FIG. 2) of either lens apparatus 3A or 3B, which is set as the master with respect to the control target.

In a case where communication is established between the operation terminals 101A and 101B, when the transfer button 136 is pressed by user operation in either of the operation terminals, a process which acquires the master setting information of the lens apparatus which is connected is executed in each of the operation terminals 101A and 101B.

In the lens apparatus which has a function used for stereoscopic imaging, that is, a function with which the lens apparatus itself is the master with respect to the driving of the control targets which are synchronized between a plurality of lens apparatuses, the setting information (ON/OFF of the dip switch 31) in the master setting section 25 (refer to FIG. 2) is temporarily stored in the storage section 23 (refer to FIG. 2) thereof and each of the operation terminals 101A and 101B transmits a request signal for the master setting information to the lens apparatus which is connected. The lens apparatus which has the stereoscopic imaging function described above transmits the master setting information which is stored in the storage section to the operation terminal when the request signal for the master setting information is received.

Then, in accordance with the result which acquires the master setting information, process which transmits the correction data to the storage section 23 of the lens apparatus which is set as the master with respect to the control target for each of the control targets is executed in the operation terminals 101A and 101B.

In the present lens system 2, since the lens apparatus 3B does not have a Inaction used for stereoscopic imaging as described above, the lens apparatus 3A is set as the master with respect to focus, zoom, and aperture which are synchronized between the lens apparatuses 3A and 3B and thus, the correction data with respect to the focus, the zoom, and the aperture are all transmitted to the storage section 23 or the lens apparatus 3A.

Hereinafter, a description will be given of a process which acquires correction data of each of the lens apparatuses of the lens system 2 using the correction apparatus 100.

Figure 14:
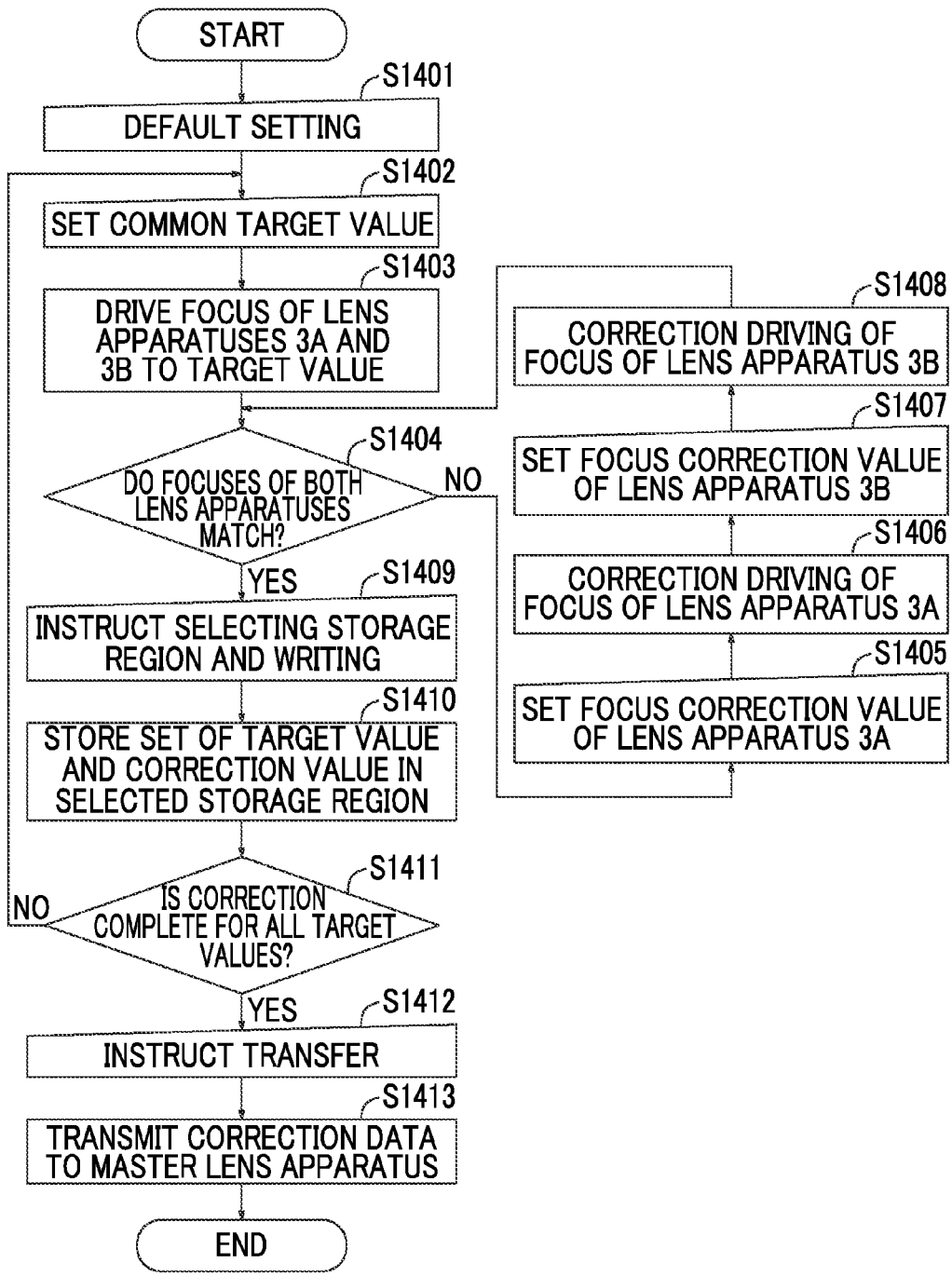
FIG. 14 is a flowchart which shows an example of a process in a case of acquiring correction data which relates to focus in the lens system in FIG. 2.

FIG. 14 shows a flow in a case of acquiring correction data which relates to the focus.

Firstly, an operation for default setting is performed in either of the operation terminal 101A or the operation terminal 101B (Step S1401). Examples of the operations for the default setting include moving the slide button 130 for establishing communication between the operation terminals 101A and 101B to the ON position in a case where communication is not established between the operation terminals 101A and 101B and selecting the focus tab 131a for setting the focus as a correction control target.

After the communication is established between the operation terminals 101A and 101B via the default setting and additionally, the correction control target is set to focus in each of the operation terminals 101A and 101B, the slider 132b of the slider bar 132 is operated in either of the operation terminal 101A or the operation terminal 101B and the common target value which relates to the focus of the lens apparatuses 3A and 3B is set (Step S1402).

For example, when one end (the Near end or Inf end) of the operational range of the focus shown by the bar 132a is a starting point, it is possible to set the target values leaving an appropriate interval so as to encompass the entire region of the operational range according to the number of the memory buttons 134a, 134b, 134c . . . .

The operation terminal 101A transmits the control signal for driving the focus of the lens apparatus 3A to the target value which is set in the slider bar 132 to the lens apparatus 3A and thereby drives the focus of the lens apparatus 3A. In parallel, the operation terminal 101B synchronizes the setting in the slider bar 132 with the operation terminal 101A, transmits a control signal for driving the focus of the lens apparatus 3B to the target value which is set to the lens apparatus 3B, and thereby drives the focus of the lens apparatus 3B (Step S1403).

An image signal is output to a display apparatus such as a monitor from each of the imaging apparatus bodies 4 on which the lens apparatuses 3A and 3B are mounted and the user determines whether or not the focus matches between the lens apparatuses 3A and 3B based on the image which is displayed on the display apparatus (Step S1404).

In a case where it is determined that the focus does not match, the slider 133b of the slider bar 133 is operated in the operation terminal 101A and a correction value which relates to the focus of the lens apparatus 3A is set as necessary (Step S1405).

In a case where the correction value is set in the slider bar 133 of the operation terminal 101A, the operation terminal 101A transmits to the lens apparatus 3A a control signal for driving the focus of the lens apparatus 3A to a value obtained by adding the correction value which is set in the slider bar 133 to the target value which is set in the slider bar 132, and thereby drives the focus of the lens apparatus 3A (Step S1406).

In addition, the slider 133b of the slider bar 133 in the operation terminal 101B is operated and the correction value which relates to the focus of the lens apparatus 3B is set as necessary (Step S1407).

In a case where the correction value is set in the slider bar 133 of the operation terminal 101B, the operation terminal 101B transmits to the lens apparatus 3B a control signal for driving the focus of the lens apparatus 3B to the value obtained by adding the correction value which is set in the slider bar 133 to the target value which is set in the slider bar 132, and thereby drives the focus of the lens apparatus (Step S1408).

In addition, the correction for matching the focus need not be performed by correcting the focuses of both the lens apparatuses 3A and 3B, and may be performed by correcting the focus of either the lens apparatus 3A or 3B.

In a case where it is determined that the focuses of the lens apparatuses 3A and 3B match, any of the memory buttons of the memory button group 134 is selected and the writing button 135a is pressed in either of the operation terminal 101A or the operation terminal 101B (Step S1409).

Each of the operation terminals 101A and 101B stores a set of a common target value in the slider bar 132, a correction value in the slider bar 133 of the operation terminal 101A, and a correction value in the slider bar 133 of the operation terminal 101B in the storage region which is selected (Step S1410).

After repeatedly performing the above process for all of the target values (Step S1411), the transfer button 136 is pressed in either of the operation terminal 101A or the operation terminal 101B (Step S1412).

Each of the operation terminals 101A and 101B detects a lens apparatus (referred to below as a master lens apparatus) which is set as the master with respect to the focus, and transmits the correction data to the storage section 23 of the master lens apparatus (Step S1413).

The correction data with respect to the zoom and aperture may be acquired in the same manner as in the case of acquiring the correction data which relates to the focus. Here, the driving of the lens apparatuses 3A and 3B by the operation terminals 101A and 101B is performed by the position control with respect to any of the focus, zoom, and aperture.

In the above, the description has been given to the case of acquiring the correction data of the two lens apparatuses which are the lens apparatuses 3A and 3B using the two operation terminals 101A and 101B; however, it is also possible to flexibly correspond to cases of acquiring correction data of three or more lens by using as many operation terminals as the number of lens apparatuses.

Next, description will be given of an operation of the lens system 2 based on the correction data.

Figure 15:
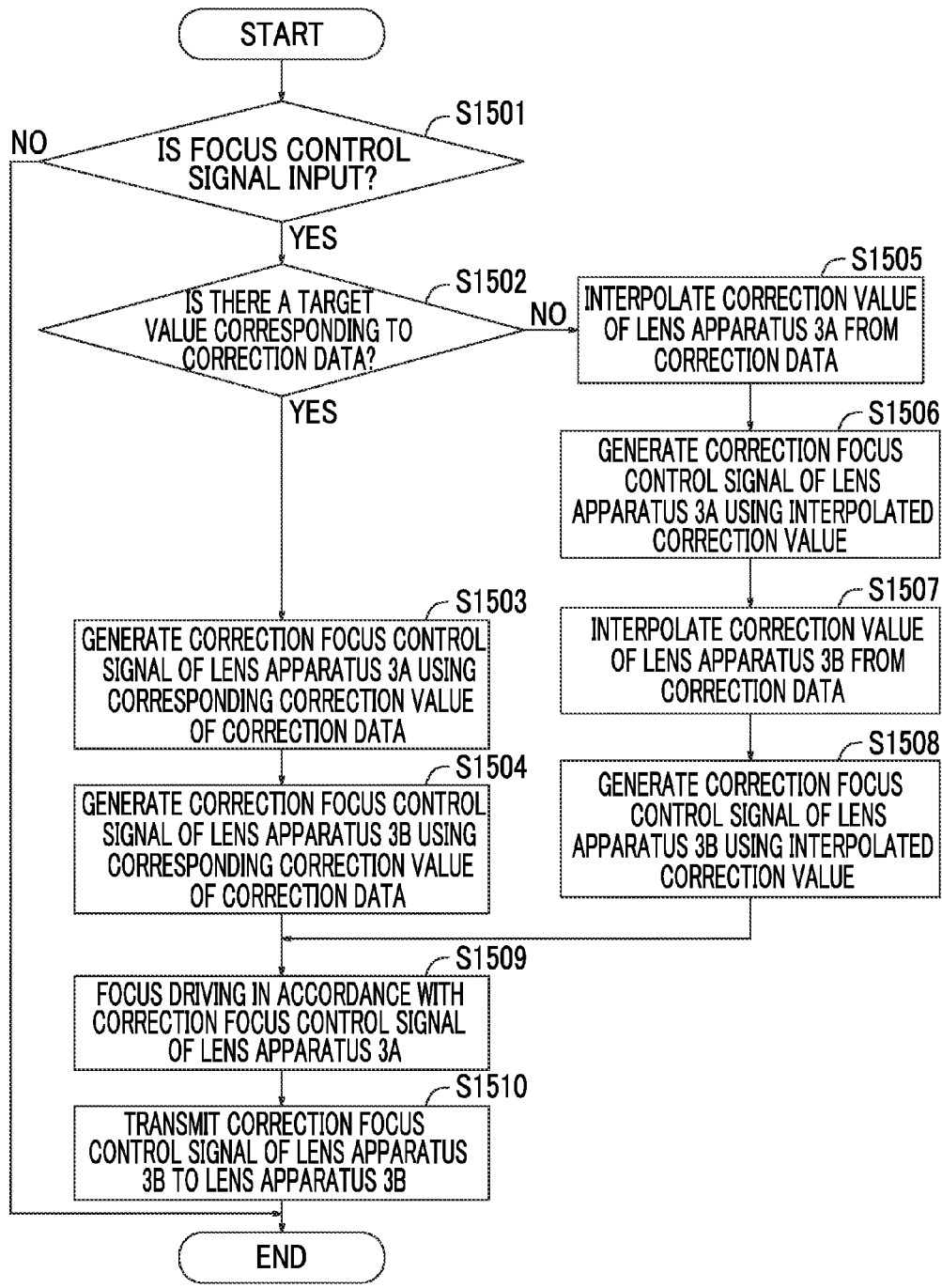
FIG. 15 is a flowchart which shows an operation of a lens apparatus which has a function used for stereoscopic imagine in a case of synchronizing focus based on correction data in the lens system in FIG. 2.
Figure 16:
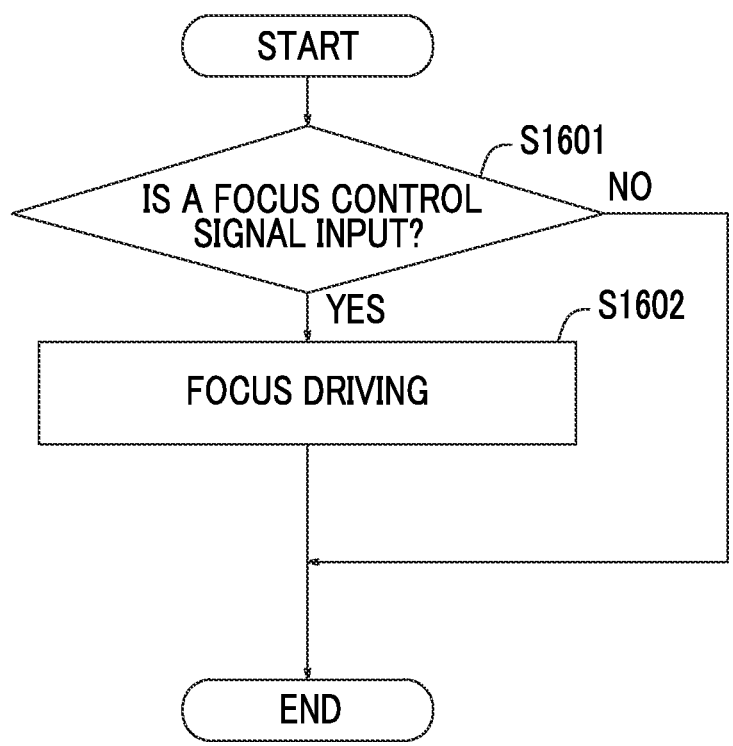
FIG. 16 is a flowchart which shows an operation of a lens apparatus which does not have a function used for stereoscopic imaging in a case of synchronizing focus based on correction data in the lens system in FIG. 2.

FIG. 15 shows an operation flow of the lens apparatus 3A and FIG. 16 shows an operation flow of the lens apparatus 3B in a case of synchronizing the focus based on the correction data in the lens system 2.

Firstly, the CPU 22 of the lens apparatus 3A detects input of the focus control signal from the focus demand 5 which is connected with the lens apparatus 3A (Step S1501).

In a case where the input of the focus control signal is detected, the CPU 22 refers to the correction data which relates to the focus and is stored in the storage section 23 and searches for the target value which corresponds to the focus control signal (Step S1502).

In a case where the target value which corresponds to the focus control signal is included in the correction data, the CPU 22 corrects the target value which corresponds to the focus control signal by adding the correction value of the lens apparatus 3A which is associated with the target value and generates a correction focus control signal for driving the focus of the lens apparatus 3A (Step S1503).

In addition, the CPU 22 corrects the target value which corresponds to the focus control signal by adding the correction value of the lens apparatus 3B which is associated with the target value and generates a correction focus control signal for driving the focus of the lens apparatus 3B (Step S1504).

In a case where the target value which corresponds to the focus control signal is not included in the correction data, a target value which is included in the correction data and is close to the corresponding target value is selected and a correction value which corresponds to the target value which corresponds to the focus control signal is interpolated using the correction value of the lens apparatus 3A which is associated with the close target value which is selected (Step S1505).

Then, the CPU 22 corrects the target value which corresponds to the focus control signal by adding the correction value which is interpolated and generates a correction focus control signal for driving the focus of the lens apparatus 3A (Step S1506).

In addition, the CPU 22 interpolates the correction value according to the target value which corresponds to the focus control signal using the correction value of the lens apparatus 3B which is associated with the close target value which is selected (Step S1507).

Then, the CPU 22 corrects the target value which corresponds to the focus control signal by adding the correction value which is interpolated and generates a correction focus control signal for driving the focus of the lens apparatus 3B (Step S1508).

Next, the CPU 22 drives the focus of the lens apparatus 3A in accordance with the correction focus control signal of the lens apparatus 3A which is generated (Step S1509).

Then, the CPU 22 transmits the correction focus control signal of the lens apparatus 3B which is generated, from the interface 16 to the lens apparatus 3B (Step S1510).

On the other hand, the CPU 22 of the lens apparatus 3B detects input of the focus control signal (the correction focus control signal) from the lens apparatus 3A (Step S1601).

In a case where the input of the focus control signal is detected, the CPU 22 drives the focus of the lens apparatus 3B in accordance with the focus control signal (Step S1602).

Thus, a state is obtained where the focus of the lens apparatus 3B matches the focus of the lens apparatus 3A.

Figure 17:
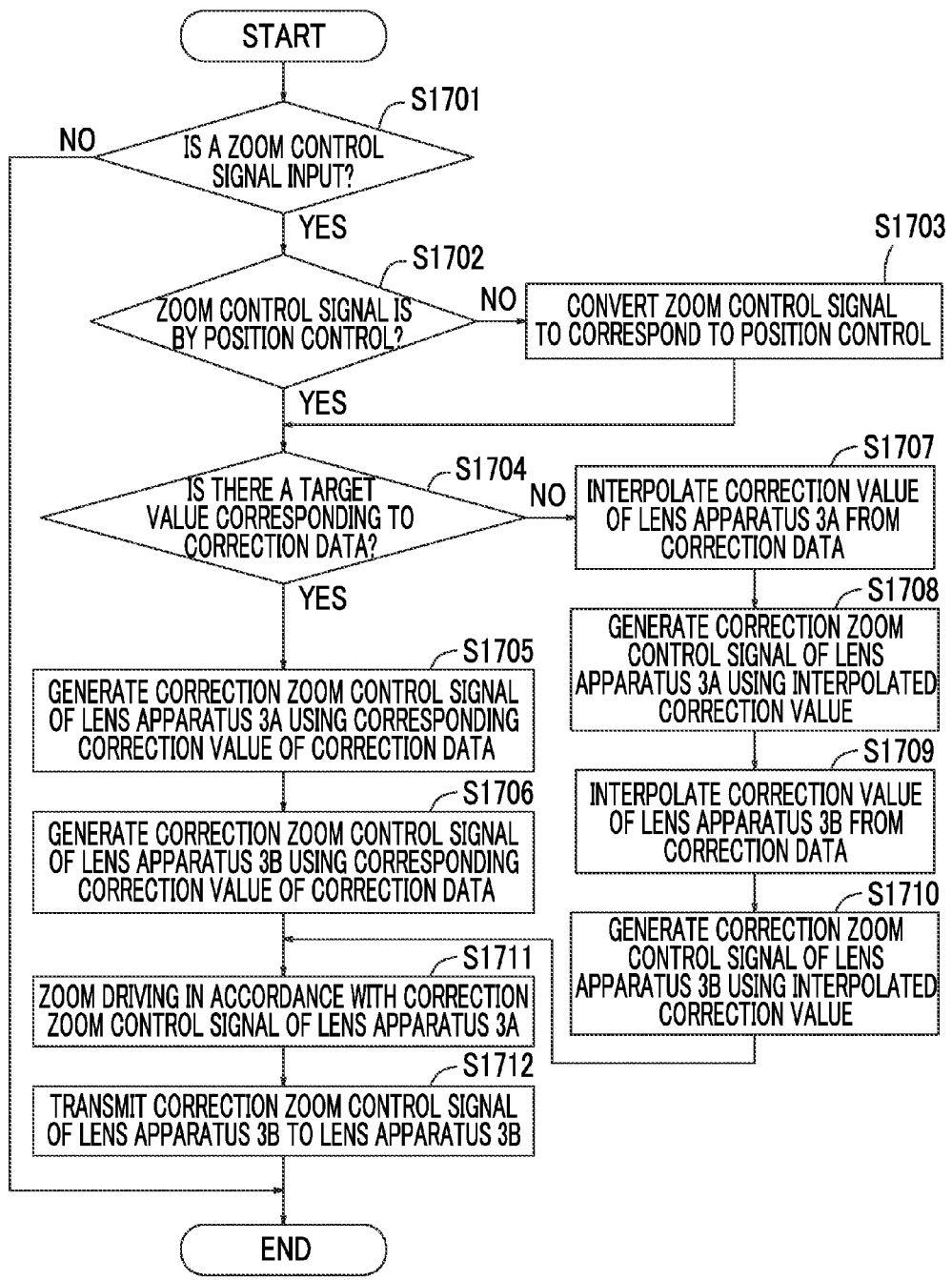
FIG. 17 is a flowchart which shows an operation of a lens apparatus which has a function used for stereoscopic imaging in a case of synchronizing zoom based on correction data in the lens system in FIG. 2.
Figure 18:
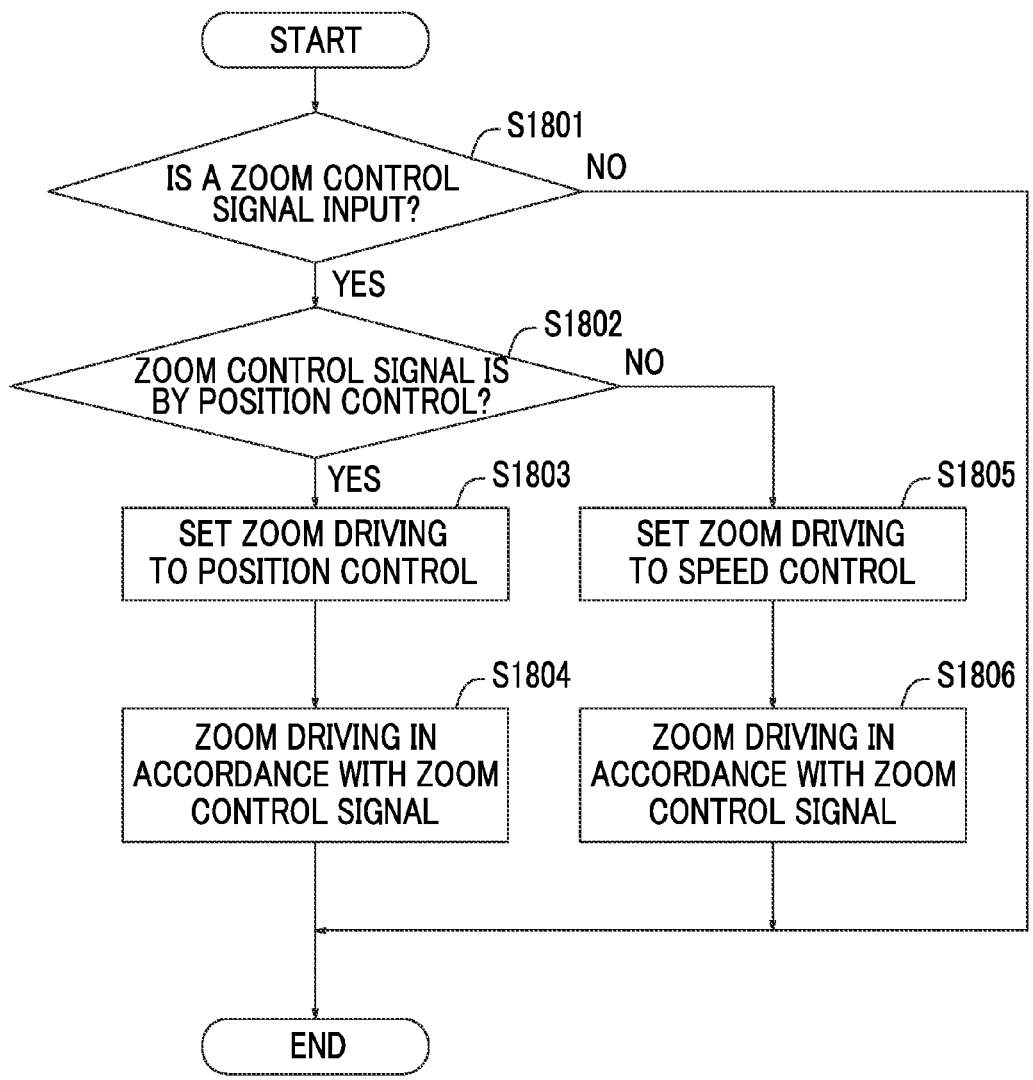
FIG. 18 is a flowchart which shows an operation of a lens apparatus which does not have a function used for stereoscopic imaging in a case of synchronizing zoom based on correction data in the lens system in FIG. 2.

FIG. 17 shows an operation flow of the lens apparatus 3A and FIG. 18 shows an operation flow of the lens apparatus 3B in a case of synchronizing the zoom based on the correction data in the lens system 2.

Firstly, the CPU 22 of the lens apparatus 3A detects input of the zoom control signal from the zoom demand 6 which is connected with the lens apparatus 3A (Step S1701).

In a case where the input of the zoom control signal is detected, the CPU 22 determines whether the zoom control signal is a signal according to the speed control or a signal according to the position control (Step S1702).

In a case where it is determined that the zoom control signal is a signal according to the speed control, the CPU 22 carries out conversion into the zoom control signal which corresponds to the position control by integration of the signal (Step S1703).

Next, the CPU 22 refers to the correction data which relates to the zoom and is stored in the storage section 23 and searches for the target value which corresponds to the zoom control signal according to the position control (Step S1704).

In a case where the target value which corresponds to the zoom control signal is included in the correction data, the CPU 22 corrects the target value which corresponds to the zoom control signal by adding the correction value of the lens apparatus 3A which is associated with the target value and generates a correction zoom control signal for driving the zoom of the lens apparatus 3A (Step S1705).

In addition, the CPU 22 corrects the target value which corresponds to the zoom control signal by adding the correction value of the lens apparatus 3B which is associated with the target value and generates a correction zoom control signal for driving the zoom of the lens apparatus 3B (Step S1706).

In a case where the target value which corresponds to the zoom control signal is not included in the correction data, a target value which is included in the correction data and is close to the corresponding target value is selected and the correction value according to the target value which corresponds to the zoom control signal is interpolated using the correction value of the lens apparatus 3A which is associated to the close target value which is selected (Step S1707).

Then, the CPU 22 corrects the target value which corresponds to the zoom control signal by adding the correction value which is interpolated and generates a correction zoom control signal for driving the zoom of the lens apparatus 3A (Step S1708).

In addition, the CPU 22 interpolates the correction value according to the target value which corresponds to the zoom control signal using the correction value of the lens apparatus 3B which is associated to the close target value which is selected (Step S1709).

Then, the CPU 22 corrects the target value which corresponds to the zoom control signal by adding the correction value which is interpolated and generates a correction zoom control signal for driving the zoom of the lens apparatus 3B (Step S1710).

Next, the CPU 22 drives the zoom of the lens apparatus 3A in accordance with the correction zoom control signal of the lens apparatus 3A which is generated (Step S1711).

Then, the CPU 22 transmits the correction zoom control signal of the lens apparatus 3B which is generated, from the interface 16 to the lens apparatus 3B (Step S1712).

On the other hand, the CPU 22 of the lens apparatus 3B detects input of the zoom control signal the correction zoom control signal) from the lens apparatus 3A (Step S1801).

In a case where the input of the zoom control signal is detected, the CPU 22 determines whether the zoom control signal is a signal according to the speed control or a signal according to the position control (Step S1802).

Here, since the zoom control signal is a position control signal, the CPU 22 switches the driving control method of the zoom driving section 20Z to the position control (Step S1803) and drives the zoom in accordance with the zoom control signal which is input (Step S1804).

Thus, a state is obtained where the focus of the lens apparatus 3B matches the focus of the lens apparatus 3A.

Here, in a case where the zoom control signal is a speed control signal, the CPU 22 switches the driving control method of the zoom driving section 20Z to the speed control (Step S1805) and drives the zoom in accordance with the zoom control signal which is input (Step S1806).

Regarding the operations of the lens apparatuses 3A and 3B in a case of synchronizing the aperture using the correction data the driving of the aperture in the lens apparatuses 3A and 3B is performed by the position control in the same manner as the driving of the focus and is the same as in the case of synchronizing the focus except for the point that the aperture control signal is input to the lens apparatus 3A from the imaging apparatus body 4 on which the lens apparatus 3A is mounted.

Figure 19A:
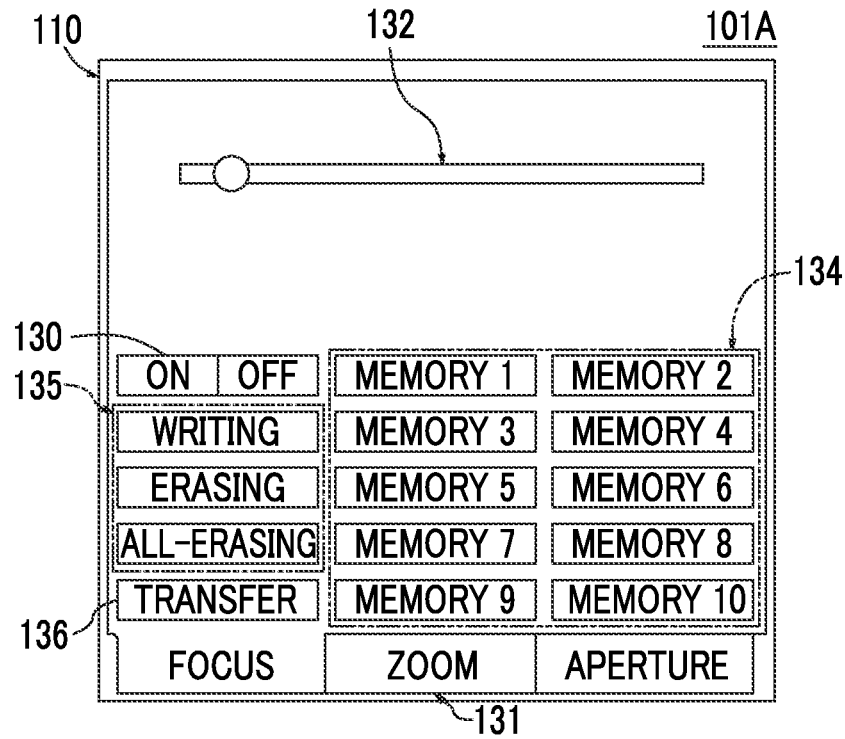
FIG. 19A and FIG. 19B are schematic diagrams, each of which shows another example of an operation screen which is displayed on the operation terminal which configures the correction apparatus in FIG. 11.
Figure 19B:
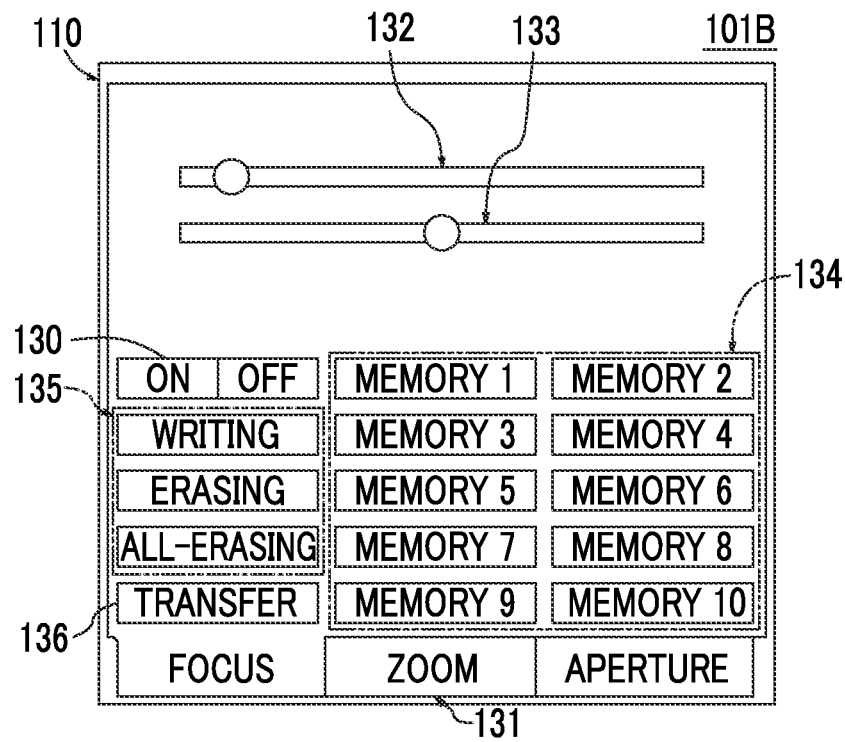

FIGS. 19A and 19B show another example of the operation screens which are displayed on the display input sections 110 of the operation terminals 101A and 101B when the application software for correction is executed.

The example shown in FIGS. 19A and 19B is different from the example shown in FIGS. 13A and 13B in the point that the slider bar 133 is omitted in the operation screen (FIG. 19A) which is displayed on the display input section 110 of the operation terminal 101A which is connected with the lens apparatus 3A which has a function used for stereoscopic imaging. Here, the operation screen (FIG. 19B) which is displayed on the display input section 110 of the operation terminal 101B is configured to be the same as the example shown in FIGS. 13A and 13B.

In the present example, with respect to the focus, the zoom or the aperture, the deviation between the lens apparatuses 3A and 3B with respect to the common control signal is corrected by operating the slider bar 133 in the operation terminal 101B and setting the correction value of the lens apparatus 3B to which the operation terminal 101B is connected.

Figure 20A:
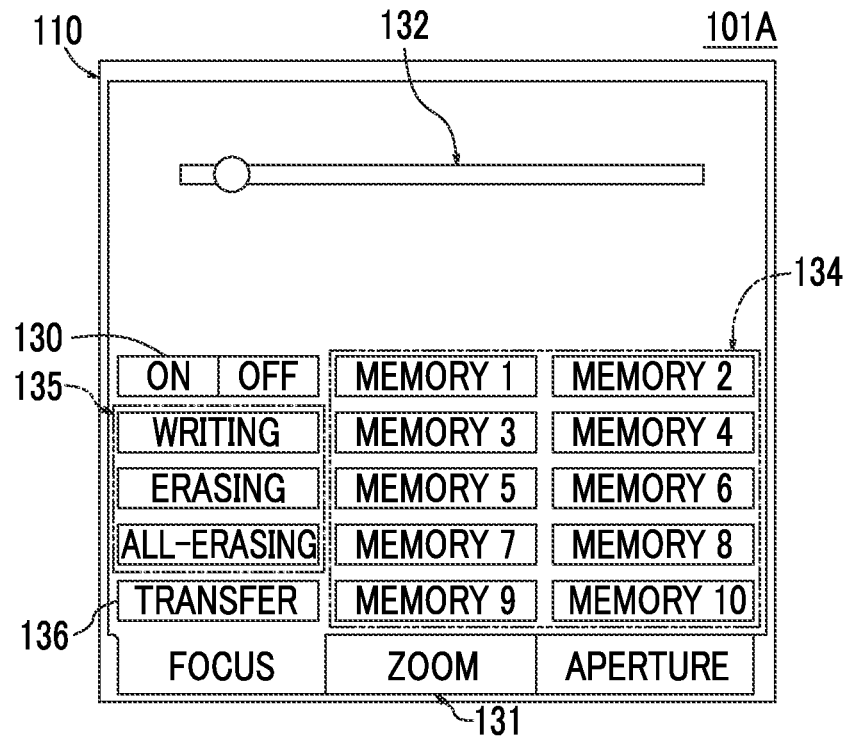
FIG. 20A and FIG. 20B are schematic diagrams, each of which shows still another example of an operation screen which is displayed on the operation terminal which configures the correction apparatus in FIG. 11.
Figure 20B:
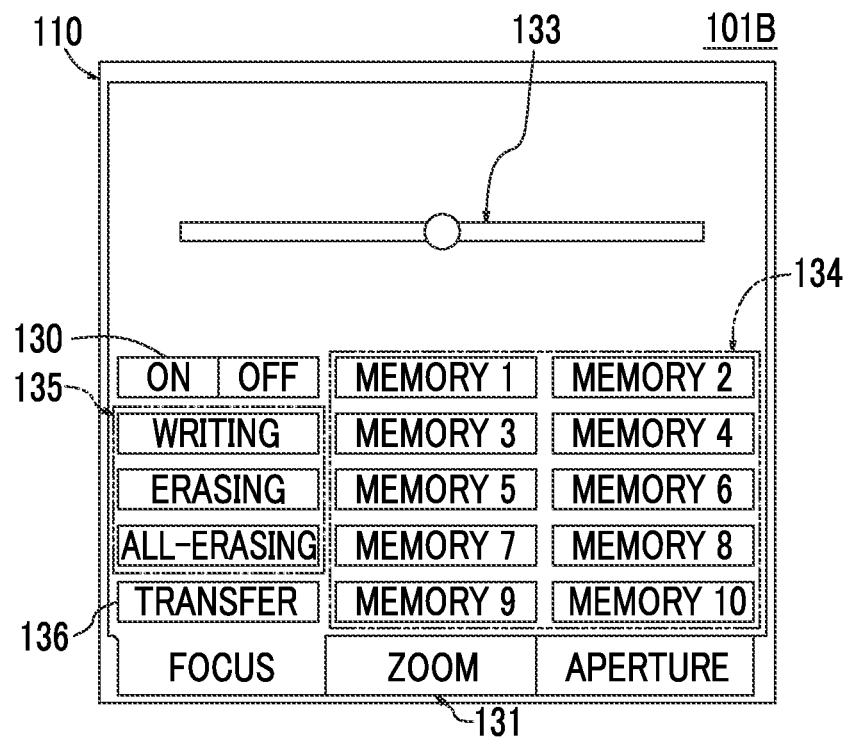

FIGS. 20A and 20B show another example of the operation screens which are displayed on the display input sections 110 of the operation terminals 101A and 101B when the application software for correction is executed.

The example shown in FIGS. 20A and 20B is different from the example shown in FIGS. 13A and 13B in the point that the slider bar 133 is omitted in the operation screen (FIG. 20A) which is displayed on the display input section 110 of the operation terminal 101A which is connected with the lens apparatus 3A which has a function used for stereoscopic imaging. In addition, the example shown in FIGS. 20A and 20B is different from the example shown in FIGS. 13A and 13B in the point that the slider bar 132 is omitted in the operation screen (FIG. 20B) which is displayed on the display input section 110 of the operation terminal 101B which is connected with the lens apparatus 3B which does not have a function used for stereoscopic imaging.

In the present example, the common target value with respect to the correction control targets of the lens apparatuses 3A and 3B is set in the slider bar 132 of the operation terminal 101A, and the operation terminal 101A transmits a control signal for driving the correction control target of the lens apparatus 3A to the target value which is set in the slider bar 132 to the lens apparatus 3A. At the same time, the operation terminal 101A transmits the target value which is set in the slider bar 132 to the operation terminal 101B. Upon receiving the target value, the operation terminal 101B transmits, to the lens apparatus 3B, a control signal for driving the correction control target of the lens apparatus 3B to the target value.

In addition, with respect to the focus, the zoom or the aperture, the deviation between the lens apparatuses 3A and 3B with respect to the common control signal is corrected by operating the slider bar 133 in the operation terminal 101B and setting the correction value of the lens apparatus 3B to which the operation terminal 101B is connected.

Here, in contrast to the example shown in FIG. 20A, the slider bar 132 in the operation terminal 101A may be omitted and the slider bar 133 in the operation terminal 101B may be omitted.

Figure 21A:
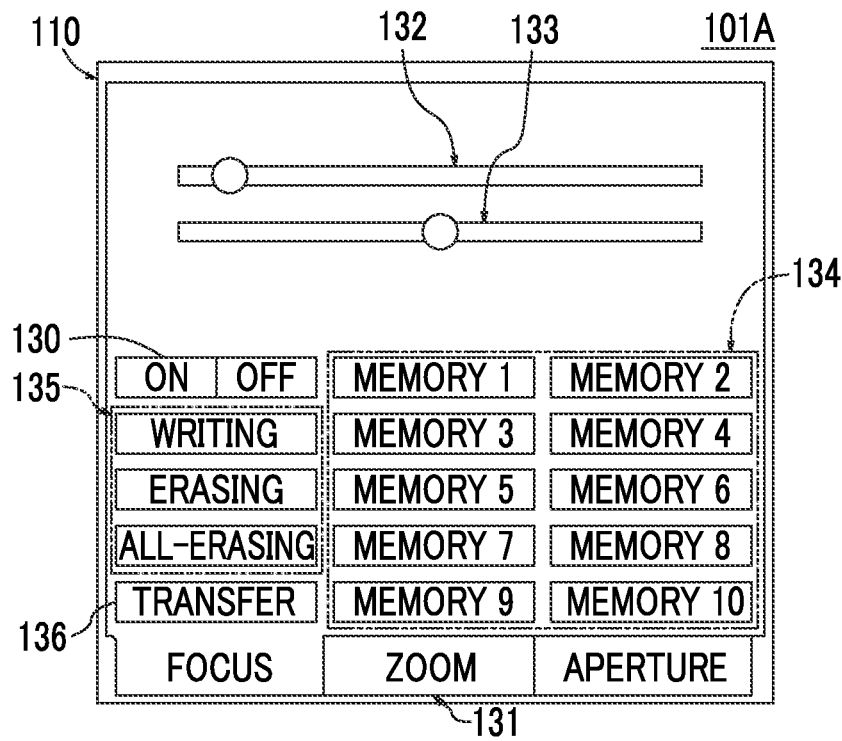
FIG. 21A and FIG. 21B are schematic diagrams, each of which shows still another example of an operation screen which is displayed on the operation terminal which configures the correction apparatus in FIG. 11.
Figure 21B:
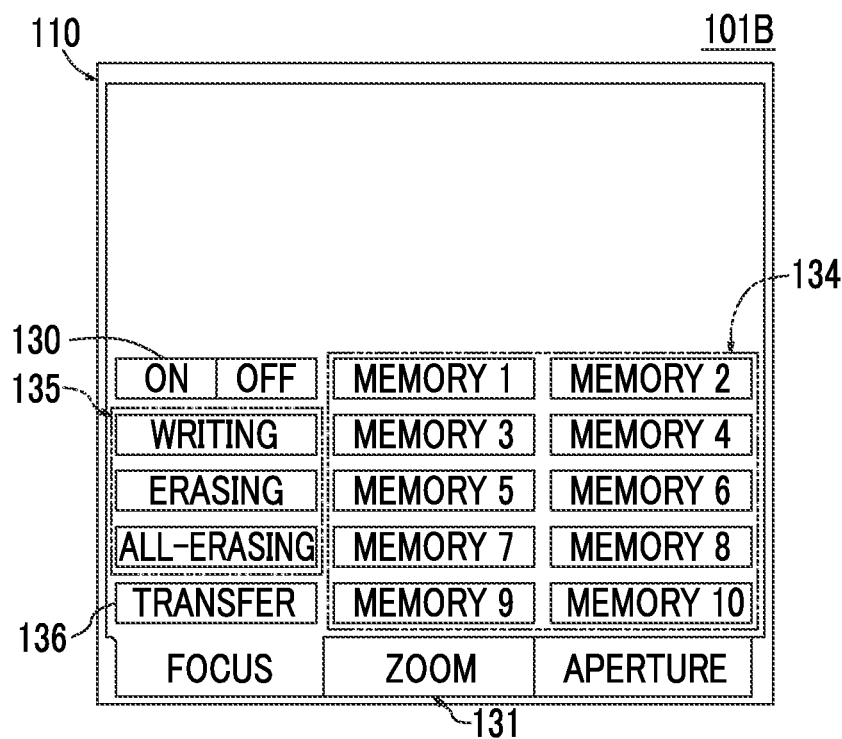

FIGS. 21A and 21B shows another example of the operation screens which are displayed on the display input sections 110 of the operation terminals 101A and 101B when the application software for correction is executed.

The example shown in FIGS. 21A and 21B is different from the example shown in FIGS. 13A and 13B in the point that the slider bars 132 aid 133 are omitted in the operation screen (FIG. 21B) which is displayed on the display input section 110 of the operation terminal 101B which is connected with the lens apparatus 3B which does not have a function used for stereoscopic imaging. Here, the operation screen (FIG. 21A) which is displayed on the display input section 110 of the operation terminal 101A is configured to be the same as the example shown in FIGS. 13A and 13B.

In the present example, the common target value with respect to the correction control targets of the lens apparatuses 3A and 3B is set in the slider bar 132 of the operation terminal 101A, and the operation terminal 101A transmits, to the lens apparatus 3A, a control signal for driving the correction control target of the lens apparatus 3A to the target value which is set in the slider bar 132. At the same time, the operation terminal 101A transmits the target value which is set in the slider bar 132 to the operation terminal 101B. Upon receiving the target value, the operation terminal transmits, to the lens apparatus 3B, a control signal for driving the correction control target of the lens apparatus 3B to the target value.

In addition with respect to the focus, the ZOOM, or the aperture, the deviation between the lens apparatuses 3A and 3B with respect to the common control signal is corrected by operating the slider bar 133 in the operation terminal 101A and setting the correction value of the lens apparatus 3A to which the operation terminal 101A is connected.

Here, in contrast to the example shown in FIGS. 21A and 21B, the slider bars 132 and 133 in the operation terminal 101A may be omitted.

FIGS. 22A and 22B show another example of the operation screens which are displayed on the display input sections 110 of the operation terminal 101A and 101B when the application software for correction is executed.

The example shown in FIGS. 22A and 22B is different from the example shown in FIGS. 13A and 13B in the point that the slider bar 133B for setting the correction value which relates to the correction control target of the lens apparatus 3B to which the operation terminal 101B is connected is provided in addition to the slider bar 133A for setting the correction value which relates to the correction control target of the lens apparatus 3A to which the operation terminal 101A is connected in the operation screen (FIG. 22A) which is displayed on display input section 110 of the operation terminal 101A which is connected with the lens apparatus 3A which has a function used for stereoscopic imaging. In addition, the example shown in FIGS. 22A and 22B is different from the example shown in FIGS. 13A and 13B in the point that the slider bars 132 and 133 are omitted in the operation screen (FIG. 22B which is displayed on the display input section 110 of the operation terminal 101B which is connected with the lens apparatus 3B which does not have a function used for stereoscopic imaging.

In the present example, the common target value with respect to the correction control targets of the lens apparatuses 3A and 3B is set in the slider bar 132 of the operation terminal 101A, and the operation terminal 101A transmits, to the lens apparatus 3A, a control signal for driving the correction control target of the lens apparatus 3A to the target value which is set in the slider bar 132. At the same time, the operation terminal 101A transmits the target value which is set in the slider bar 132 to the operation terminal 101B. Upon receiving the target value, the operation terminal 101B transmits, to the lens apparatus 3B, a control signal for driving the correction control target of the lens apparatus 3B to the target value.

In addition, with respect to the focus, the room, or the aperture, the deviation between the lens apparatuses 3A and 3B with respect to the common control signal is corrected by operating the slider bars 133A and 133B in the operation terminal 101A as necessary and setting one or both of the correction values of the lens apparatuses 3A and 3B.

According to the example shown in FIGS. 22A and 22B, it is possible to perform setting of the common target value which relates to the correction control targets of the lens apparatuses 3A and 3B and setting of the individual correction values of the lens apparatuses 3A and 3B with only one operation terminal 101A and the operability is increased.

Here, in contrast to the example in FIGS. 22A and 22B, the slider bar 133a for setting the correction value which relates to the correction control target of the lens apparatus 3A to which the operation terminal 101A is connected and the slider bar 133b for setting the correction value which relates to the correction control target of the lens apparatus 3B to which the operation terminal 101B is connected may be provided in the operation terminal 101B.

Figure 23A:
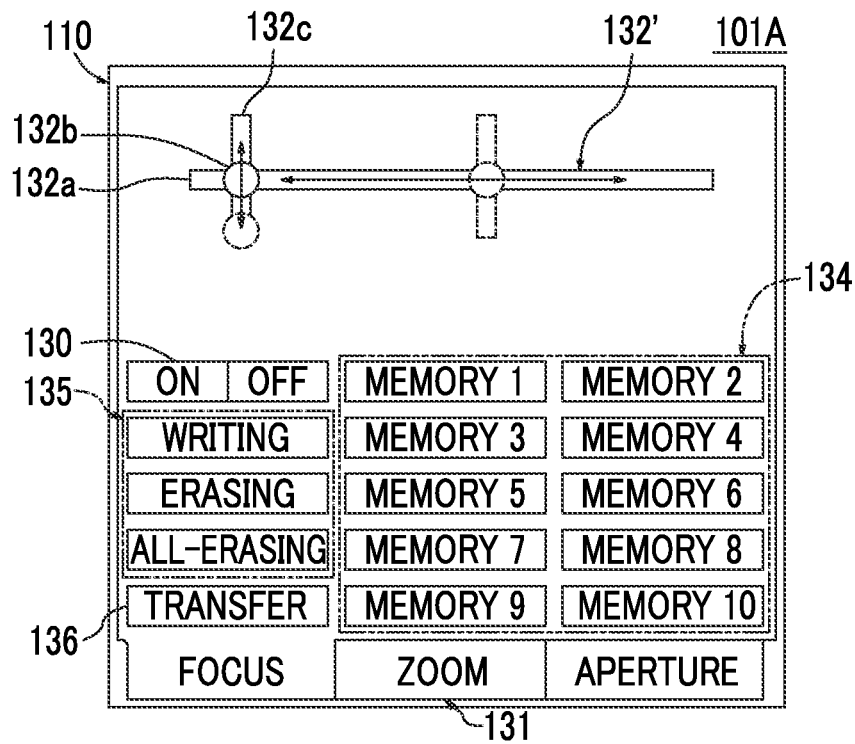
FIG. 23A and FIG. 23B are schematic diagrams, each of which shows still another example of an operation screen which is displayed on the operation terminal which configures the correction apparatus in FIG. 11.
Figure 23B:
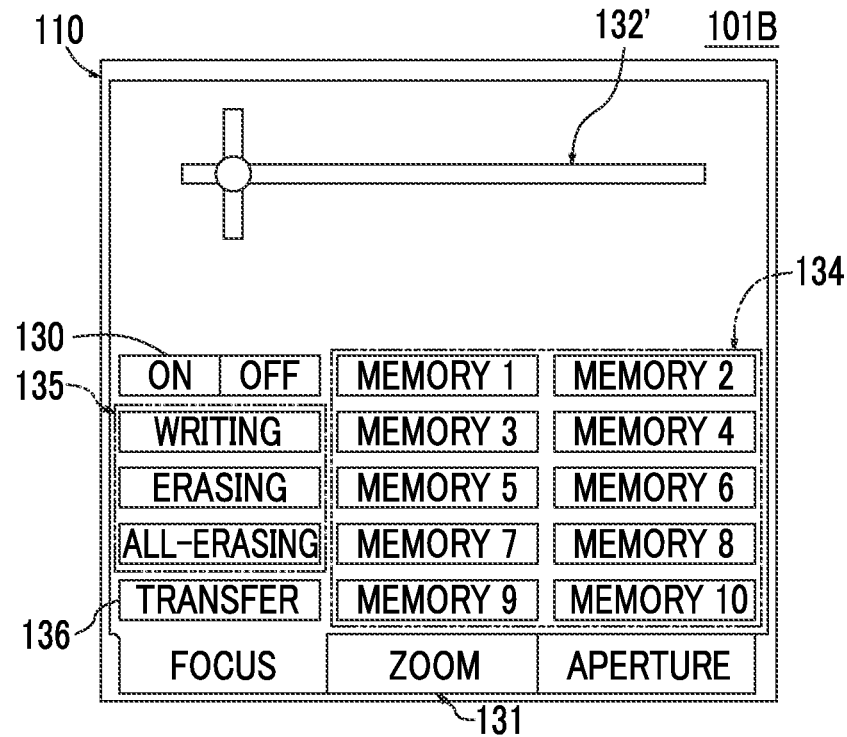

FIGS. 23A and 23B show another example of the operation screens which are displayed on the display input sections 110 of the operation terminals 101A and 101B when the application software for correction is executed.

The example shown in FIGS. 23A and 23B is different from the example shown in FIGS. 13A and 13B in terms of the configuration of the slider bar for setting the common target value which relates to the correction control targets of the lens apparatuses 3A and 3B and the individual correction value in the operation screen (FIG. 23A) which is displayed on the display input section 110 of the operation terminal 101A and the operation screen (FIG. 23 which is displayed on the display input section 110 of the operation terminal 101B.

The slider bar 132' of the operation terminal 101A is configured so as to set the individual correction value with respect to the correction control target of the lens apparatus 3A along with setting the common target value with respect to the correction control targets of the lens apparatuses 3A and 3B. In addition, the slider bar 132' of the operation terminal 101B is configured so as to set the individual correction value regarding the correction control target of the lens apparatus 3B along with setting the common target value regarding the correction control targets of the lens apparatuses 3A and 3B.

The slider bar 132' of the operation terminal 101A is configured to include the bar 132a which shows the operational range of the correction control target, a bar 132c which shows the correctable range in relation to the correction control target of the lens apparatus 3A, and the slider 132b which shows a correction value according to the position on the bar 132c along with showing the target value according to the position on the bar 132a. The bar 132c is provided to extend in a direction which is substantially orthogonal to the bar 132a.

The slider 132b is moved along the bar 132a by a dragging operation being carried out along the bar 132a which shows the operational range in a state where a finger of the user or a stylus is on the slider 132b. In addition, the slider 132b is moved along the bar 132c by a dragging operation being carried out along the bar 132c which shows the correctable range.

The bar 132c which shows the correctable range is moved along the bar 132a to accompany the slider 132b along with the slider 132b being moved along the bar 132a which shows the operational range.

The slider bar 132' of the operation terminal 101B is configured to include the bar 132a which shows the operational range of the correction control target, the bar 132c which shows the correctable range in relation to the correction control target of the lens apparatus 3B, and the slider 132b which shows the correction value according to the position on the bar 132c along with showing the target value according to the position on the bar 132a. The bar 132c is provided to extend in a direction which is substantially orthogonal to the bar 132a. Here, the movements of the slider 132b and of the bar 132c to accompany the slider 132b according to a user operation are the same as for the slider bar 132' of the operation terminal 101A.

In a case where communication is established between the operation terminals 101A and 101B and where the slider 132b is moved along the bar 132a which shows the operational range by a user operation in either of the operation terminals, the position information of the slider 132b is transmitted to another operation terminal. In the other operation terminal, the slider 132b is moved along the bar 132a based on the position information which is received regardless of the user operation. Thus, synchronization of the position of the slider 132b on the bar 132a is obtained between the operation terminals 101A and 101B and the common target value is set with respect to the correction control targets of the lens apparatuses 3A and 3B.

The slider 132b is moved along the bar 132c which shows the correctable range by the user operation in the operation terminal 101A as necessary and the correction value which relates to the correction control target of the lens apparatus 3A is set, additionally, the slider 132b is moved along the bar 132c which shows the correctable range by the user operation in the operation terminal 101B and the correction value which relates to the correction control target of the lens apparatus 3B is set. The positions of the sliders 132b on the bars 132c in the operation terminals 101A and 101B are not synchronized with each other and therefore, individual correction values are sot with respect to the correction control targets of the lens apparatuses 3A and 3B.

In the examples which are each shown in FIGS. 13A and 13B and FIGS. 19A and 19B to FIGS. 23A to 23B, there is a configuration where the slider bar 132 (132') for setting the common target value which relates to the correction control targets of the lens apparatuses 3A and 3B is provided in at least one of the operation terminals out of the operation terminals 101A and 101B and a common control signal is transmitted from the operation terminal 101A to the lens apparatus 3A and from the operation terminal 101B to the lens apparatus 3B. According to this configuration, it is possible to drive the correction control targets of the lens apparatuses 3A and 3B to the common target value in a batch, deviation in the correction control targets between the lens apparatuses 3A and 3B with respect to the common control signal is easily detected, and it is possible to correct the deviation.

In the above, the description has been given to the case where the common target value and the individual correction values which relate to the correction control targets of the lens apparatuses 3A and 3B are set by the slider bars 132 (132') and 133 in the examples which are each shown in FIGS. 13A and 13B and FIGS. 19A and 19B to FIGS. 23A and 23B; however, for example, setting may be carried out according to the rotation angle of the volume switch or the input of a number.

In addition, in the examples which are each shown in FIGS. 13A and 13B and FIGS. 19A and 19B to FIGS. 23A and 23B, the deviation of the correction control targets between the lens apparatuses 3A and 3B with respect to the common control signal is corrected by setting the common target value which relates to the correction control targets of the lens apparatuses 3A and 3B and setting the individual correction value of the lens apparatus 3A and/or the lens apparatus 3B with respect to the common target value; however, it is possible to carry out correction by setting a plurality of arbitrary target values with respect to the correction control target of one lens apparatus without setting the common target value and matching the correction control target of the other lens apparatus with the correction control target of the one lens apparatus which is driven to each of the target values.

Figure 24A:
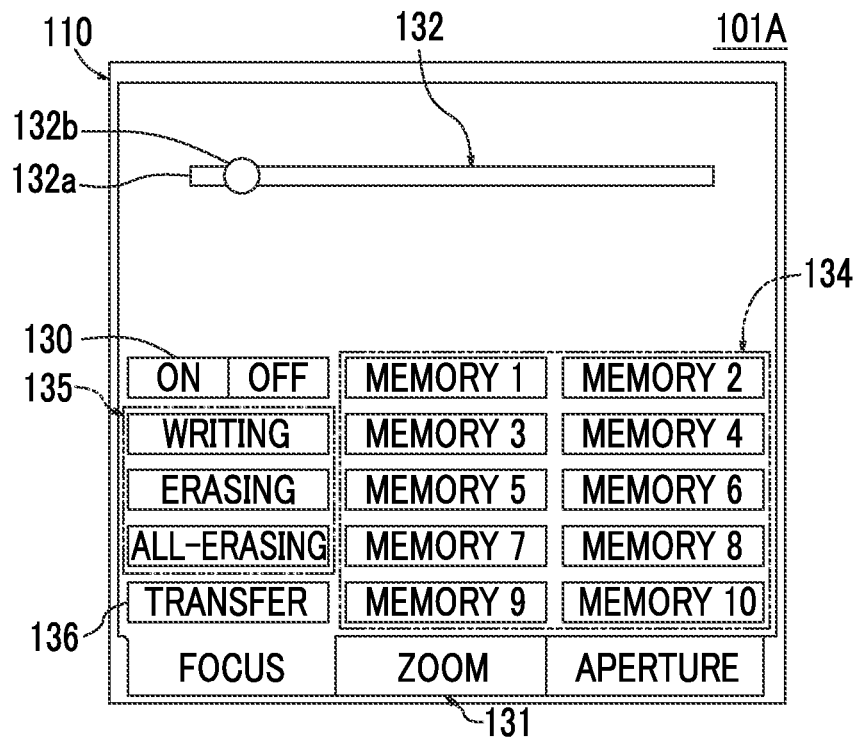
FIG. 24A and FIG. 24B are schematic diagrams, each of which shows still another example of an operation screen which is displayed on the operation terminal which configures the correction apparatus in FIG. 11.
Figure 24B:
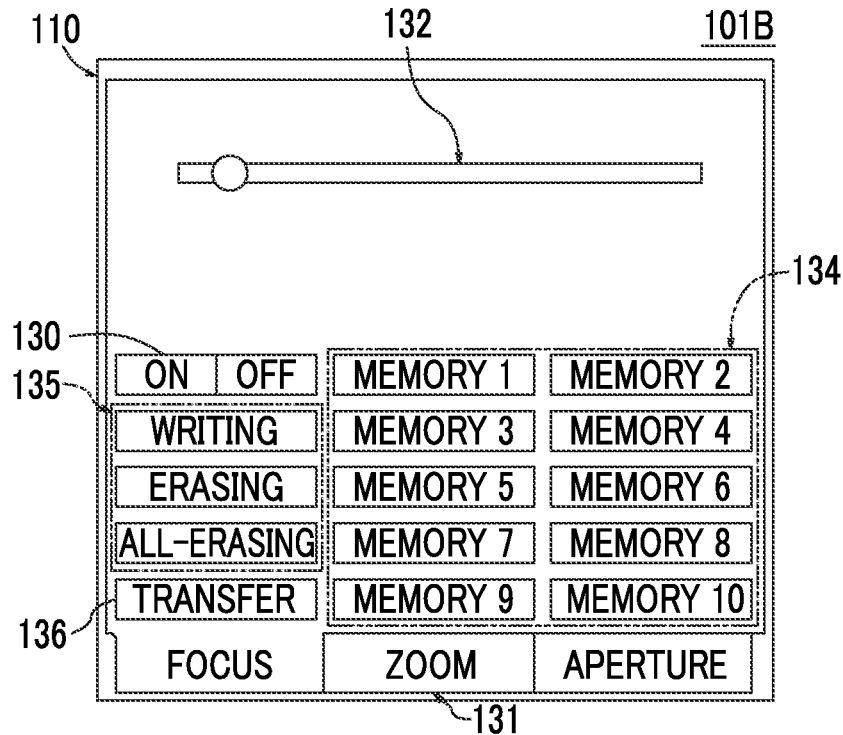

FIGS. 24A and 24B show another example of the operation screens which are displayed on the display input sections 110 of the operation terminals 101A and 101B when the application software for correction is executed.

The example shown in FIGS. 24A and 24B is different from the example shown in FIGS. 13A and 13B in terms of the function of the slider bar 132 in the operation screen (FIG. 24A) which is displayed on the display input section 110 of the operation terminal 101A and the operation screen (FIG. 24B) which is displayed on the display input section 110 of the operation terminal 101B and is also different from the example shown in FIGS. 13A and 13B in the point that the slider bar 133 is omitted.

In the present example, the slider bar 132 of the operation terminal 101A is for setting the target value of the correction control target of the lens apparatus 3A to which the operation terminal 101A is connected. In addition, the slider bar 132 of the operation terminal 101B is for setting the target value of the correction control target of the lens apparatus 3B to which the operation terminal 101B is connected.

The slider bar 132 is configured to include the bar 132a which shows the operational range of the correction control target and the slider 132b which shows the target value according to the position on the bar 132a and the slider 132b is moved along the bar 132a by a dragging operation being carried out along the bar 132a in a state where a finger of the user or a stylus is on the slider 132b.

The position of the slider 123b on the bar 123a in the operation terminal 101A and the position of the slider 123b on the bar 123a in the operation terminal 101B are not synchronized with each other and thus, individual target values are set with respect to the correction control targets of the lens apparatuses 3A and 3B.

A set of the target value which is set in the slider bar 132 of the operation terminal 101A and the target value which is set in the slider bar 132 of the operation terminal 101B is written in each of a plurality of the storage regions which are secured in the storage section 112 (refer to FIG. 12).

Each of the operation terminals 101A and 101B detects the lens apparatus which is set as the master for each of the control targets and transmits the correction data which relates to the control target to the master lens apparatus. Then, correction data is generated from the set group of the target values which are stored in each of the plurality of the storage regions by setting the target value of the master lens apparatus as the common target value, the correction value of the master lens apparatus as 0, and the difference between the target value of the other lens apparatus and the target value of the master lens apparatus as the correction value of the other lens apparatus, and the correction data is transmitted to the master lens apparatus.

Here, in the same manner as in the example shown in FIGS. 22A and 22B, the slider bar 132 for setting the correction value which relates to the correction control target of the lens apparatus 3B to which the operation terminal 101B is connected may be provided in addition to the slider bar 132 for setting the target value which relates to the correction control target of the lens apparatus 3A to which the operation terminal 101A is connected.

Figure 25:
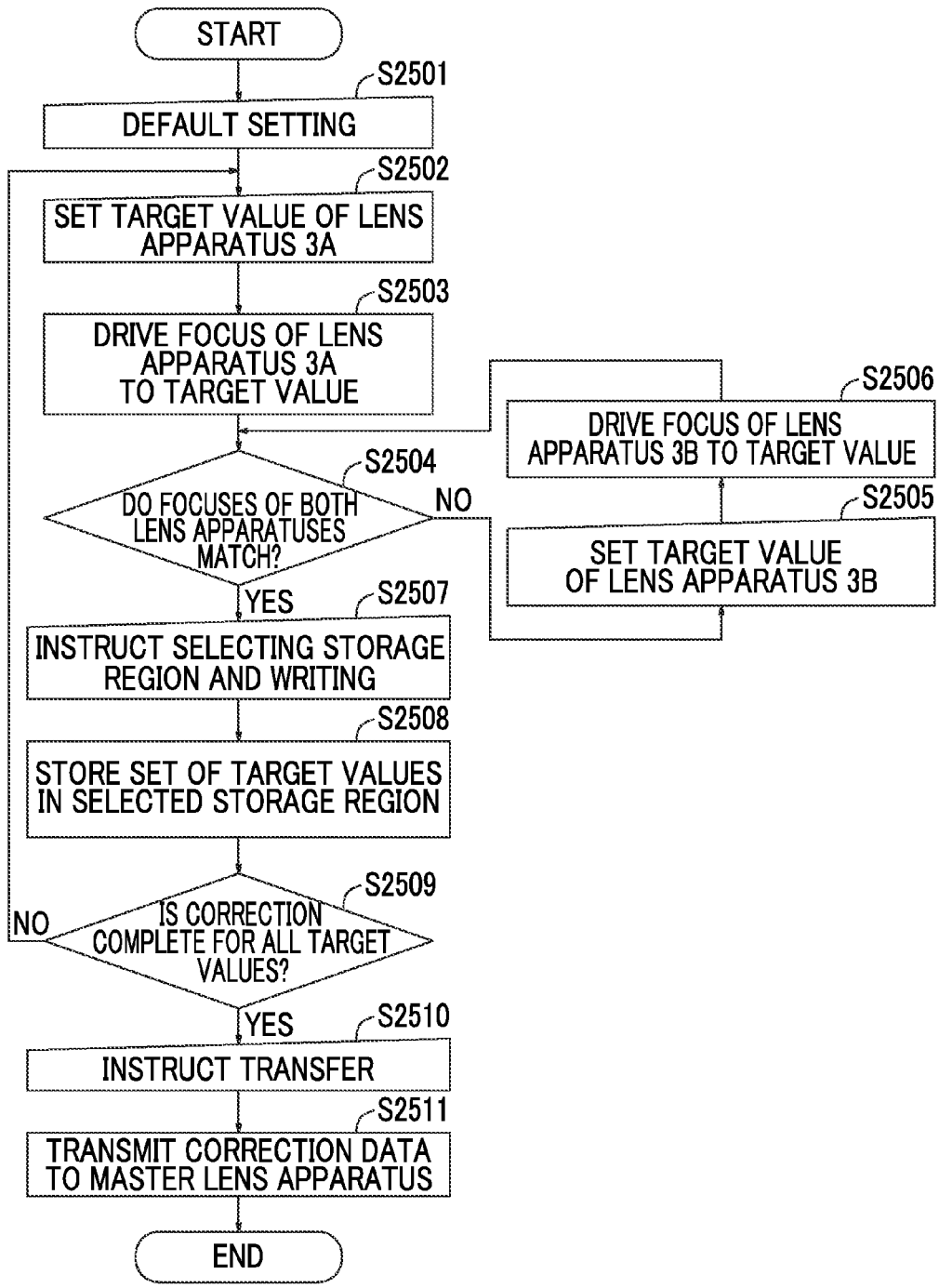
FIG. 25 is a flowchart which shows another example of a process in a case of acquiring correction data which relates to focus in the lens system in FIG. 2.

FIG. 25 shows a flow in a case of acquiring the correction data which relates to the focus. Hereinafter, the description will be given to a case where a plurality of arbitrary target values are set with respect to the focus of the lens apparatus 3A and the focus of the lens apparatus 3B is matched with the focus of the lens apparatus 3A which is driven to each of the target values.

Firstly, an operation for default setting is performed in the operation terminal 101A (Step S2501).

In the default setting, after communication between the operation terminals 101A and 101B is established and additionally, the correction control target is set to the focus in each of the operation terminals 101A and 101B, the slider 132b of the slider bar 132 is operated and the target value of the focus of the lens apparatus 3A is set in the operation terminal 101A (Step S2502).

For example, when one end (the Near end or Inf end) of the movable range of the focus shown by the bar 132a is a starting point, it is possible to set the target values leaving an appropriate interval so as to encompass the entire region of the movable range according to the number of the memory buttons 134a, 134b, 134c . . . .

The operation terminal 101A transmits a control signal for driving, the focus of the lens apparatus 3A to the target value which is sot in the slider bar 132 to the lens apparatus 3A and thereby drives the focus of the lens apparatus 3A (Step S2503).

An image signal is output to a display apparatus such as a monitor from each of the imaging apparatus bodies 4 on which the lens apparatuses 3A and 3B are mounted and the user determines whether or not the focus matches between the lens apparatuses 3A and 3B based on an image which is displayed on the display apparatus (Step S2504).

In a case where it is determined that the focus does not match, the slider 132b of the slider bar 132 in the operation terminal 101B is operated and the target value with respect to the focus of the lens apparatus 3B is set (Step S2505).

The operation terminal 101B transmits a control signal for driving the focus of the lens apparatus 3B to the target value which is set in the slider bar 132 to the lens apparatus 3B and thereby drives the focus of the lens apparatus 3B (Step S2506).

In a case were it is determined that the focuses of the lens apparatuses 3A and 3B match, any of the memory buttons of the memory button group 134 is selected and the writing button 135a is pressed in either of the operation terminal 101A or the operation terminal 101B so as to select a storage region which is open (Step S2507).

Each of the operation terminals 101A and 101B stores a set of a target value in the slider bar 132 of the operation terminal 101A and a target value in the slider bar 132 of the operation terminal 101B in the storage region which is selected (Step S2508).

After repeatedly performing the above process for all of the target values (Step S2509), the transfer button 136 is pressed in either of the operation terminal 101A or the operation terminal 101B (Step S2510).

Each of the operation terminals 101A and 101B detects the lens apparatus which is set as the master with respect to the focus and transmits the correction data to the storage section 23 of the master lens apparatus (Step S2511).

Figure 26:
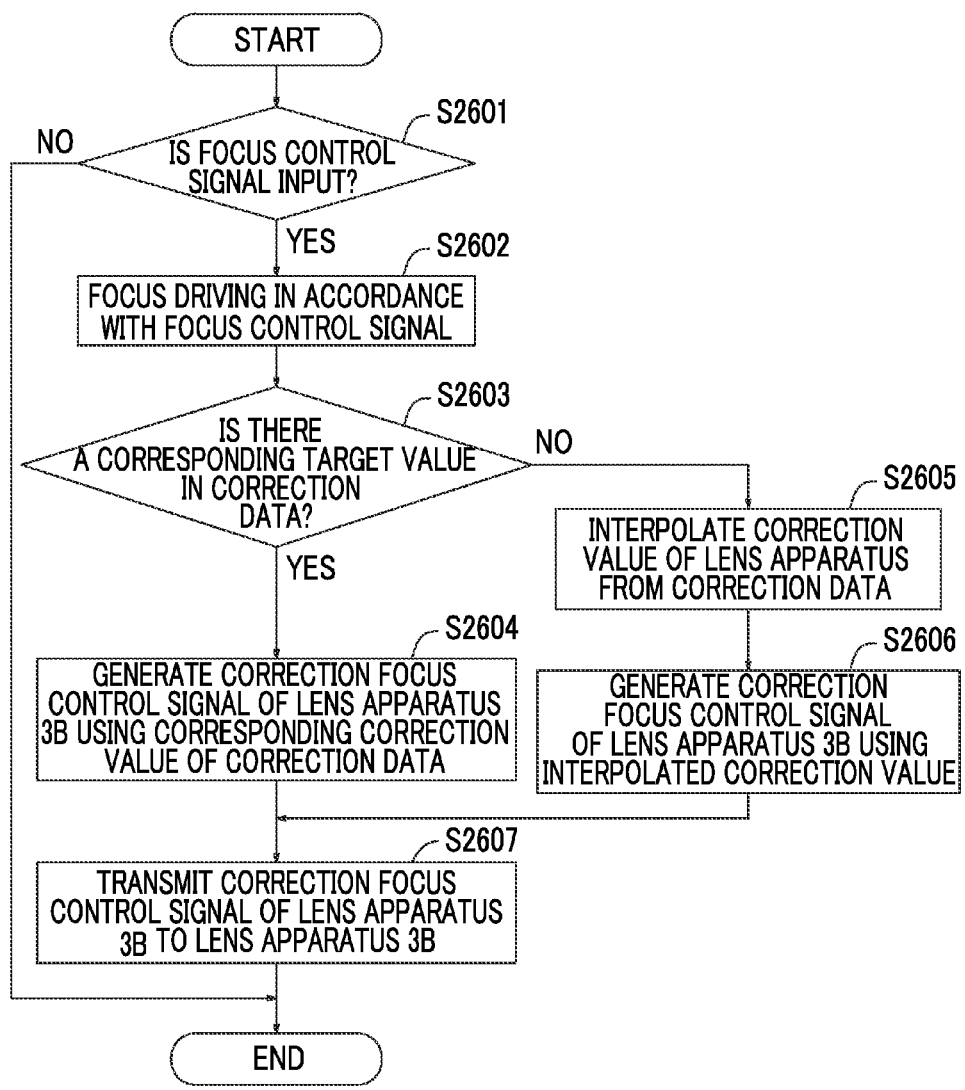
FIG. 26 is a flowchart which shows an operation of a lens apparatus which has a function used for stereoscopic imaging in a case of synchronizing focus based on correction data in the lens system in FIG. 2.

FIG. 26 shows an operation flow of the lens apparatus 3A in a case of synchronizing the focus based on the correction data in the lens system 2.

Firstly, the CPU 22 of the lens apparatus 3A detects input of the focus control signal from the focus demand 5 which is connected with the lens apparatus 3A (Step S2601).

As described above, since the correction value of the lens apparatus 3A which is set as the master with respect to the focus is 0, in a case when the input of the focus control signal is detected, the CPU 22 drives the focus of the lens apparatus 3A in accordance with the focus control signal which is input (Step S2602).

Next, the CPU 22 refers to the correction data which relates to the focus and is stored in the storage section 23 and searches for the target value which corresponds to the focus control signal (Step S2603).

In a case where the target value which corresponds to the focus control signal is included in the correction data, the CPU 22 corrects the target value which corresponds to the focus control signal by adding the correction value of the lens apparatus 3B which is associated with the target value and generates a correction focus control signal for driving the focus of the lens apparatus 3B (Step S2604).

In a case where the target value which corresponds to the focus control signal is not included in the correction data, a target value which is included in the correction data and is close to the corresponding target value is selected and the correction value according to the target value which corresponds to the focus control signal is interpolated using the correction value of the lens apparatus 3B which is associated with the close target value which is selected (Step S2605).

Then, the CPU 22 corrects the target value which corresponds to the focus control signal by adding the correction value which is interpolated and generates a correction focus control signal for driving the focus of the lens apparatus 3B (Step S2606).

Next, the CPU 22 transmits the correction focus control signal of the lens apparatus 3B which is generated, from the interface 16 to the lens apparatus 3B (Step S2607).

The operation of the lens apparatus 3B when the correction focus control signal is received from the lens apparatus 3A is as described with reference to FIG. 16.

Figure 27:
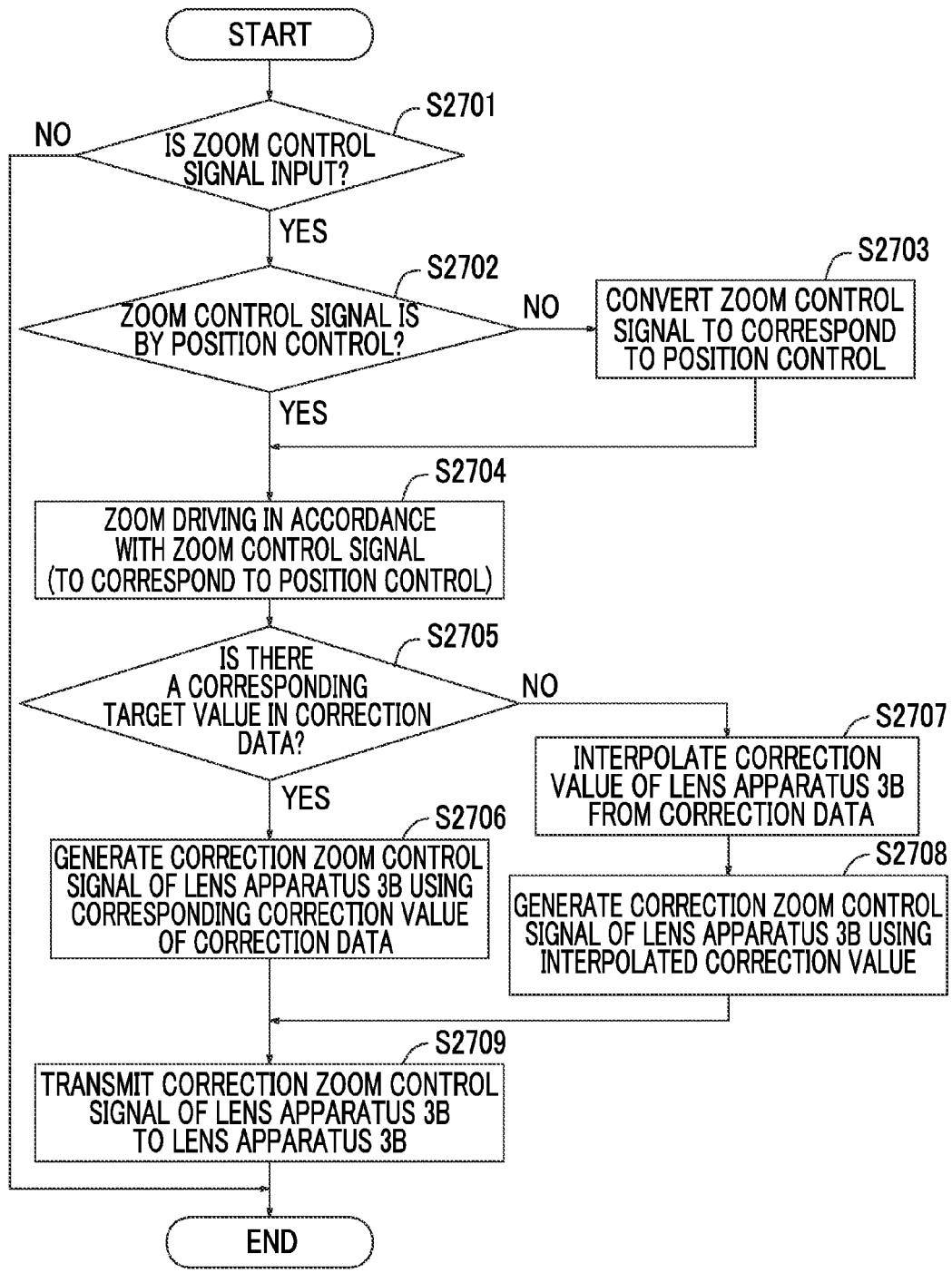
FIG. 27 is a flowchart which shows an operation of a lens apparatus which has a function used for stereoscopic imaging in a case of synchronizing zoom based on correction data in the lens system in FIG. 2.

FIG. 27 shows an operation now of the lens apparatus 3A in a case of synchronizing the zoom used on the correction data in the lens system 2.

Firstly, the CPU 22 of the lens apparatus 3A detects input of the zoom control signal from the zoom demand 6 which is connected with the lens apparatus 3A (Step S2701).

In a case where the input of the zoom control signal is detected, the CPU 22 determines whether the zoom control signal is a signal according to the speed control or a signal according to the position control (Step S2702).

In a case where it is determined that the zoom control signal is a signal according to the speed control, the CPU 22 carries out conversion into a zoom control signal which corresponds to the position control by integration of the signal (Step S2703) and drives the zoom of the lens apparatus 3A in accordance with the zoom control signal which is converted due to the position control (Step S2704).

In addition, in a case where it is determined that the zoom control signal is a signal according to the position control, the CPU 22 drives the zoom of the lens apparatus 3A according to the zoom control signal which is input (Step S2704).

Next, the CPU 22 refers to the correction data which relates to the zoom and is stored in the storage section 23 and searches for the target value which corresponds to the zoom control signal according to the position control (Step S2705).

In a case where the target value which corresponds to the zoom control signal is included in the correction data, the CPU 22 corrects the target value which corresponds to the zoom control signal by adding the correction value of the lens apparatus 3B which is associated with the target value and generates a correction zoom control signal for driving the zoom of the lens apparatus 3B (Step S2706).

In a case where the target value which corresponds to the zoom control signal is not included in the correction data the target value which is included in the correction data and is close to the corresponding target value is selected and the correction value according to the target value which corresponds to the zoom control signal is interpolated using the correction value of the lens apparatus 3B which is associated with the close target value which is selected (Step S2707).

Then, the CPU 22 corrects the target value which corresponds to the zoom control signal by adding the correction value which is interpolated and generates a correction zoom control signal for driving the zoom of the lens apparatus 3B (Step S2708).

Next, the CPU 22 transmits the correction zoom control signal of the lens apparatus 3B which is generated, from the interface 16 to the lens apparatus 3B (Step S2709).

The operation of the lens apparatus 3B when the correction zoom control signal is received from the lens apparatus 3A is as described with reference to FIG. 18.

In addition, regarding the operation of the lens apparatuses 3A and 3B in a case of synchronizing the aperture using the correction data, the driving of the aperture in the lens apparatuses 3A and 3B is performed by the position control in the same manner as the driving of the focus and is the same as in the case of synchronizing the focus except for the point that the aperture control signal is input to the lens apparatus 3A from the imaging apparatus body 4 on which the lens apparatus 3A is mounted.

Thus, the correction value in the lens apparatus 3A which is set as the master is always 0 in a case of a configuration which corrects the deviation of the correction control targets between the lens apparatuses 3A and 3B with respect to the common control signal by setting a plurality of arbitrary target values with respect to the correction control target of one lens apparatus and matching the correction control target of the other lens apparatus with the correction control target of the one lens apparatus which is driven to each of the target values. Accordingly, with respect to the driving of the control target of the lens apparatus 3A, the lens apparatus 3A may be operated in accordance with the control signal which is input, whereby the processing load in the CPU 22 is reduced and it is possible to improve responsiveness.

In the above description, the correction apparatus 100 is configured by the operation terminals 101A and 101B which are connected one-to-one correspondence with the lens apparatuses 3A and 3B and smartphones are preferably used as the operation terminals 101A and 101B; however, it is possible to configure one terminal using a personal computer or the like which is able to connect a plurality of lens apparatuses.

As described above, the following matters are disclosed in the present specification.

(1) A correction apparatus for correcting a mismatch in at least one control target between a plurality of lens apparatuses when a common control signal for driving, the control target is input to the plurality of lens apparatuses, the plurality of lens apparatuses being used in a state where the control target are synchronized therebetween, including a group of terminals which are connected in one-to-one correspondence with each of the plurality of lens apparatuses and which transmit the control signal for driving the control target of the lens apparatuses to the lens apparatuses connected therewith, where the group of terminals is configured so that each terminal of all of the group of terminals transmits, to the lens apparatus connected therewith, the common control signal for driving the control target of the lens apparatus, and so that each terminal of all of the group terminals or each terminal of other terminals than any one terminal of the group of terminals transmit, to the lens apparatus connected therewith, an individual control signal for driving the control target of the lens apparatus, and the group of terminals are communicably connected with each other and mutually hold the common control signal and the individual control signals.

(2) The correction apparatus according to (1), further including a first operation section for setting a common control value for transmitting the common control signal in all of the terminals of the group of terminals.

(3) The correction apparatus according to (2), further including one or more second operation sections for setting individual control values for transmitting the individual control signals in every terminal which transmits the individual control signal, a number of the second operation sections being same as a number of the terminals which transmit the individual control signals.

(4) The correction apparatus according (3), where the first operation section and all of the second operation sections are provided by being aggregated into one terminal of the terminal group.

(5) The correction apparatus according to (2), where each terminal of the terminal group includes a touch panel, and the first operation section includes a bar, which shows an operational range of the control target of the plurality of lens apparatuses, and a slider, which is set to be able to move along the bar and which shows the common control value according to a position on the bar, the first operation section being displayed on the touch panel.

(6) The correction apparatus according to (3), where each of the terminals of the group of terminals includes a touch panel, the first operation section includes a bar, which shows an operational range of the control target of the plurality of lens apparatuses, and a slider, which is set to be able to move along the bar and which shows the common control value according to a position on the bar, each of the second operation sections includes a bar, which shows a correctable range of the control targets of the lens apparatus which is connected with the terminal provided with the second operation section, and a slider, which is set to be able to move along the bar and which shows the individual control values according to a position on the bar, and each of the first operation section and the second operation section is displayed on the touch panel.

(7) A correction apparatus for correcting a mismatch in at least one control target between a plurality of lens apparatuses when a common control signal for driving the control target is input to the plurality of lens apparatuses, the plurality of leans apparatuses being used by in a state where the control target are synchronized therebetween, including a group of terminals which are connected in one-to-one correspondence with each of the plurality of lens apparatuses and which transmit the Control signal for driving the control target of the lens apparatuses to the lens apparatuses connected therewith, where the group of terminals is configured so that each terminal of tall the group of terminals transmits, to the lens apparatus connected therewith, an individual control signal bar driving the control target of the lens apparatus, and the group of terminals are communicably connected with each other and mutually hold the common control signal and the individual control signals.

(8) The correction apparatus according to (7) further including one or more operation sections for setting individual control values for transmitting the individual control signals in every terminal which transmits the individual control signal, a number of the operation sections being same as a number of the terminals which are included in the group of terminals.

(9) The correction apparatus according to (8), where all of the operation sections are provided by being aggregated into one terminal of the group of terminals.

(10) The correction apparatus according to (8) or (9), where each of the terminals of the group of terminals includes a touch panel, and each of the operation sections includes a bar, which shows an operational range of the control target of the plurality of lens apparatuses which are connected with the terminals provided with the operation section, and a slider, which is set to be able to move along the bar and which shows the individual control value according to a position on the bar, each of the operation sections being displayed on the touch panel.

(11) The correction apparatus according to any one of (1) to (10) where each of the plurality of terminals is a smartphone.

What is claimed is:

1. A correction apparatus for correcting a mismatch in at least one control target between first and second lens apparatuses when a common control signal for driving the control target to a target value is input to the first and second lens apparatuses, the first and second lens apparatuses being used in a state where the control target are synchronized therebetween, comprising:

a first terminal which is connected with the first lens apparatus and which transmits the control signal for driving the control target of the first lens apparatus to the first lens apparatus;

a second terminal which is connected with the second lens apparatus and which transmits the control signal for driving the control target of the second lens apparatus to the second lens apparatus, the first and second terminals being configured so that the first terminal transmits, to the first lens apparatus, the common control signal for driving the control target of the first lens apparatus, and the second terminal transmits, to the second lens apparatus, the common control signal for driving the control target of the second lens apparatus, and so that the first terminal transmits, to the first lens apparatus connected therewith, a first individual control signal for driving the control target of the first lens apparatus to a control value obtained by adding a correction value for correcting the mismatch in the control target between the first and second terminals to the target value, and the second terminal transmits, to the second lens apparatus, a second individual control signal for driving the control target of the second lens apparatus to the control value obtained by adding a correction value for correcting the mismatch in the control target between the first and second terminals to the target value, or, either one of the first and second terminals transmits, to either one of the first and second lens apparatus, either of the first and second individual control signals obtained by adding a correction value for correcting the mismatch in the control target between the first and second terminals to the target value, and the first and second terminals being communicably connected with each other and mutually hold the common control signal and the first and second individual control signals;

a first operation section that sets a common control value for transmitting the common control signal in all of the terminals of the first and second terminals; and one or more second operation sections that set individual control values for transmitting the first and second individual control signals in every terminal of the first and second terminals or the either one of the first and second terminals which transmit the individual control signal, a number of the one or more second operation sections being same as a number of the terminals which transmit the first and second individual control signals, wherein:

each terminal of the first and second terminals includes a touch panel, the first operation section includes a bar that indicates an operational range of the control target of the first and second lens apparatuses, and also includes a slider, which moves along the bar to indicate the common control value according to a position on the bar, each of the one or more second operation sections including a bar that indicates a correctable range of the control targets of the first and second lens apparatuses or of either one of the first and second lens apparatuses connected with the first and second terminals or either one of the first and second lens apparatuses provided with the second operation section, and also includes a slider that moves along the bar and indicates the individual control values according to a position on the bar, and each of the first operation section and the one or more second operation sections is displayed on the touch panel.

2. The correction apparatus according to claim 1, wherein the first operation section and all of the second operation sections are provided by being aggregated into one terminal of the first and second terminals.

3. A correction apparatus for correcting a mismatch in at least one control target between first and second lens apparatuses when a common control signal for driving the control target to a target value is input to the first and second lens apparatuses, the first and second lens apparatuses being used in a state where the control target are synchronized therebetween, comprising:

a first terminal which is connected with the first lens apparatus and which transmits the control signal for driving the control target of the first lens apparatus to the first lens apparatus;

a second terminal which is connected with the second lens apparatus and which transmits the control signal for driving the control target of the second lens apparatus to the second lens apparatus, the first and second terminals being configured so that the first terminal transmits, to the first lens apparatus, a first individual control signal for driving the control target of the first lens apparatus to a control value obtained by adding a correction value for correcting the mismatch in the control target between the first and second terminals to the target value, and the second terminal transmits, to the second lens apparatus, a second individual control signal for driving the control target of the second lens apparatus to the control value obtained by adding a correction value for correcting the mismatch in the control target between the first and second terminals to the target value, and the first and second terminals being communicably connected with each other and mutually hold the common control signal and the first and second individual control signals; and one or more operation sections that set individual control values for transmitting the first and second individual control signals in every terminal which transmits the individual control signal, a number of the one or more operation sections being same as a number of the terminals which are included in the first and second terminals, wherein:

each of the first and second terminals includes a touch panel, and each of the one or more operation sections includes a bar that indicates an operational range of the control target of the first and second lens apparatuses which are connected with the terminals provided with the operation section, and also includes a slider that moves along the bar to indicate the individual control value according to a position on the bar, each of the one or more operation sections being displayed on the touch panel.

4. The correction apparatus according to claim 3, wherein all of the operation sections are provided by being aggregated into one terminal of the first and second terminals.

5. The correction apparatus according to claim 1, wherein each of the first and second terminals is a smartphone.

6. The correction apparatus according to claim 2, wherein each of the first and second terminals is a smartphone.

7. The correction apparatus according to claim 3, wherein each of the first and second terminals is a smartphone.

8. The correction apparatus according to claim 4, wherein each of the first and second terminals is a smartphone.

* * * * *